(12) United States Patent
Si et al.

(10) Patent No.: US 11,723,008 B2
(45) Date of Patent: Aug. 8, 2023

(54) METHOD AND APPARATUS FOR DETERMINING SUBCARRIER OFFSET IN UNLICENSED SPECTRUM

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/814,216

(22) Filed: Jul. 21, 2022

(65) Prior Publication Data

US 2022/0361173 A1 Nov. 10, 2022

Related U.S. Application Data

(63) Continuation of application No. 17/090,786, filed on Nov. 5, 2020, now Pat. No. 11,412,514.

(60) Provisional application No. 63/039,651, filed on Jun. 16, 2020, provisional application No. 63/012,446, filed on Apr. 20, 2020, provisional application No. 63/009,738, filed on Apr. 14, 2020, provisional application No. 62/990,593, filed on Mar. 17, 2020, provisional application No. 62/939,879, filed on Nov. 25, 2019, provisional application No. 62/938,997, filed on Nov. 22, 2019.

(51) Int. Cl.
*H04W 72/04* (2023.01)
*H04W 16/14* (2009.01)
*H04W 72/0453* (2023.01)

(52) U.S. Cl.
CPC ....... *H04W 72/0453* (2013.01); *H04W 16/14* (2013.01)

(58) Field of Classification Search
CPC .......................... H04W 72/0453; H04W 16/14
See application file for complete search history.

(56) References Cited

U.S. PATENT DOCUMENTS

| 2019/0350018 A1* | 11/2019 | Moosavi | H04W 76/11 |
| 2020/0351818 A1* | 11/2020 | Park | H04W 68/02 |
| 2021/0168574 A1* | 6/2021 | Zhang | H04W 56/001 |

* cited by examiner

*Primary Examiner* — Joshua L Schwartz

(57) ABSTRACT

Methods and apparatuses in a wireless communication system operating with shared spectrum channel access. A method of operating a UE includes receiving an SS/PBCH block; determining a higher-layer parameter ssb-SubcarrierOffset based on an MIB of a PBCH included in the SS/PBCH block; determining a bit ($\bar{a}_{\bar{A}+5}$) from a payload of the PBCH; and determining a first value ($k_{SSB}$) based on a second value ($\bar{k}_{SSB}$). Four LSBs of the second value ($\bar{k}_{SSB}$) are indicated by the higher-layer parameter ssb-SubcarrierOffset and an MSB of the second value ($\bar{k}_{SSB}$) is indicated by the bit ($\bar{a}_{\bar{A}+5}$).

17 Claims, 14 Drawing Sheets

METHOD AND APPARATUS FOR DETERMINING SUBCARRIER OFFSET IN UNLICENSED SPECTRUM

CROSS-REFERENCE TO RELATED APPLICATIONS AND CLAIM OF PRIORITY

This application is a continuation of U.S. patent application Ser. No. 17/090,786, filed on Nov. 5, 2020, which claims priority to: U.S. Provisional Patent Application No. 62/938,997, filed on Nov. 22, 2019; U.S. Provisional Patent Application No. 62/939,879, filed on Nov. 25, 2019; U.S. Provisional Patent Application No. 62/990,593, filed on Mar. 17, 2020; U.S. Provisional Patent Application No. 63/009,738, filed on Apr. 14, 2020; U.S. Provisional Patent Application No. 63/012,446, filed on Apr. 20, 2020; and U.S. Provisional Patent Application No. 63/039,651, filed on Jun. 16, 2020. The content of the above-identified patent documents is incorporated herein by reference.

TECHNICAL FIELD

The present disclosure relates generally to wireless communication systems and, more specifically, the present disclosure relates to subcarrier offset determination in unlicensed spectrum.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to wireless communication systems and, more specifically, the present disclosure relates to subcarrier offset determination in unlicensed spectrum.

In one embodiment, a (UE) in a wireless communication system operating with shared spectrum channel access is provided. The UE comprises a transceiver configured to receive a synchronization signals and physical broadcast channel (SS/PBCH) block. The UE further comprises a processor operably connected to the transceiver, the processor configured to: determine a higher-layer parameter ssb-SubcarrierOffset based on a master information block (MIB) of a PBCH included in the SS/PBCH block; determine a bit $(\bar{a}_{\bar{A}+5})$ from a payload of the PBCH; and determine a first value $(k_{SSB})$ based on a second value $(\bar{k}_{SSB})$, wherein four least significant bits (LSBs) of the second value $(\bar{k}_{SSB})$ are indicated by the higher-layer parameter ssb-SubcarrierOffset and a most significant bit (MSB) of the second value $(\bar{k}_{SSB})$ is indicated by the bit $(\bar{a}_{\bar{A}+5})$.

In another embodiment, a base station (BS) in a wireless communication system operating with shared spectrum channel access is provided. The BS comprises a processor configured to generate MIB of a PBCH included in a SS/PBCH block, wherein a higher-layer parameter ssb-SubcarrierOffset is included in the MIB and generate a payload of the PBCH, wherein a bit $(\bar{a}_{\bar{A}+5})$ is included in the payload of the PBCH. The BS further comprises a transceiver operably connected to the processor, the transceiver configured to transmit the SS/PBCH block including the MIB and the payload of the PBCH, wherein a first value $(k_{SSB})$ is indicated based on a second value $(\bar{k}_{SSB})$, four LSBs of the second value $(\bar{k}_{SSB})$ being indicated by the higher-layer parameter ssb-SubcarrierOffset and an MSB of the second value $(\bar{k}_{SSB})$ being indicated by the bit $(\bar{a}_{\bar{A}+5})$.

In yet another embodiment, a method of a UE in a wireless communication system operating with shared spectrum channel access is provided The method comprises: receiving an SS/PBCH block; determining a higher-layer parameter ssb-SubcarrierOffset based on an MIB of a PBCH included in the SS/PBCH block; determining a bit $(\bar{a}_{\bar{A}+5})$ from a payload of the PBCH; and determining a first value $(k_{SSB})$ based on a second value $(\bar{k}_{SSB})$, wherein four LSBs of the second value $(\bar{k}_{SSB})$ are indicated by the higher-layer parameter ssb-SubcarrierOffset and an MSB of the second value $(\bar{k}_{SSB})$ is indicated by the bit $(\bar{a}_{\bar{A}+5})$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation"; 3GPP TS 38.212 v15.4.0, "NR; Multiplexing and Channel coding"; 3GPP TS 38.213 v15.4.0, "NR; Physical Layer Procedures for Control"; 3GPP TS 38.214 v15.4.0, "NR; Physical Layer Procedures for Data"; and 3GPP TS 38.331 v15.4.0, "NR; Radio Resource Control (RRC) Protocol Specification."

Figure 1:
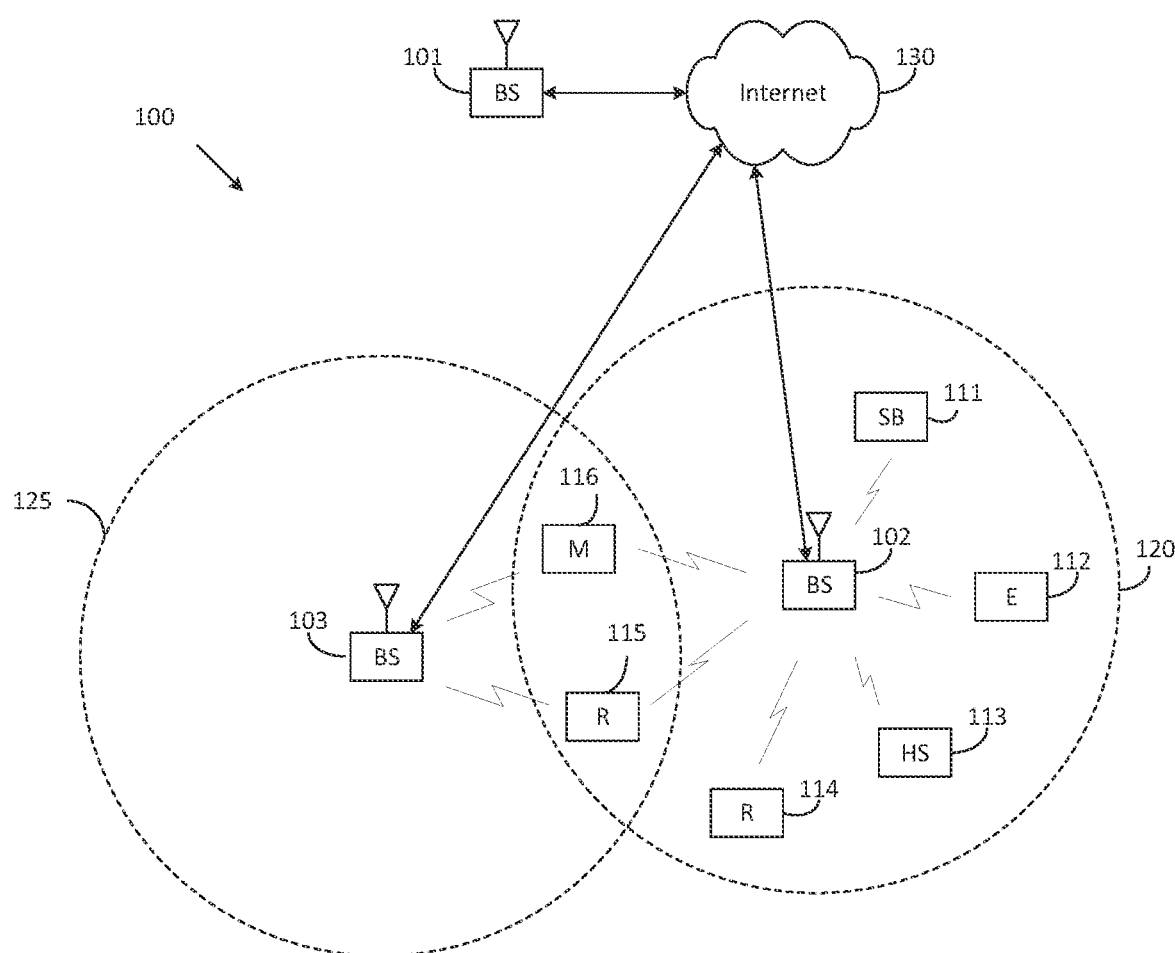
FIG. 1 illustrates an example wireless network according to embodiments of the present disclosure.
Figure 2:
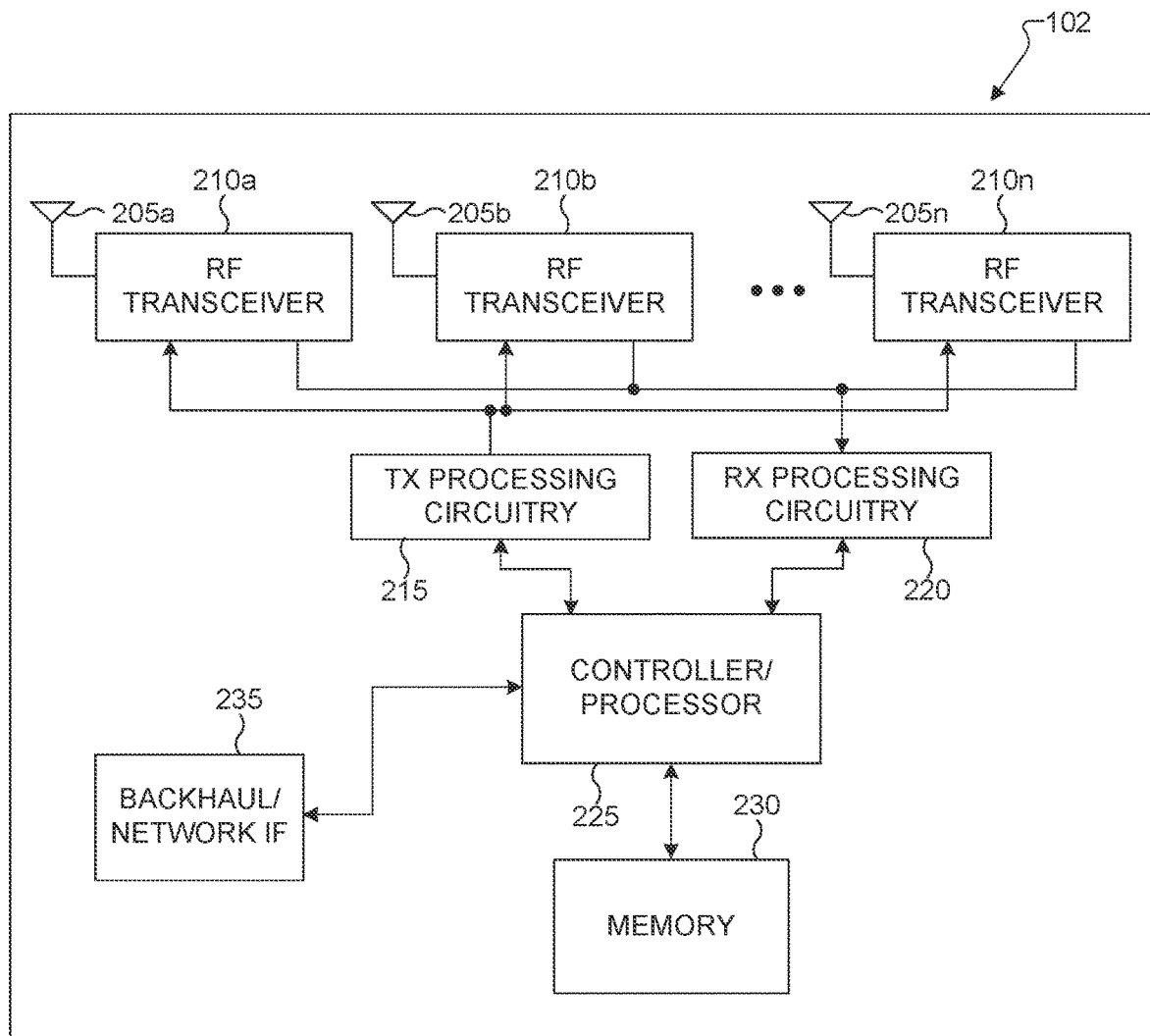
FIG. 2 illustrates an example gNB according to embodiments of the present disclosure.
Figure 3:
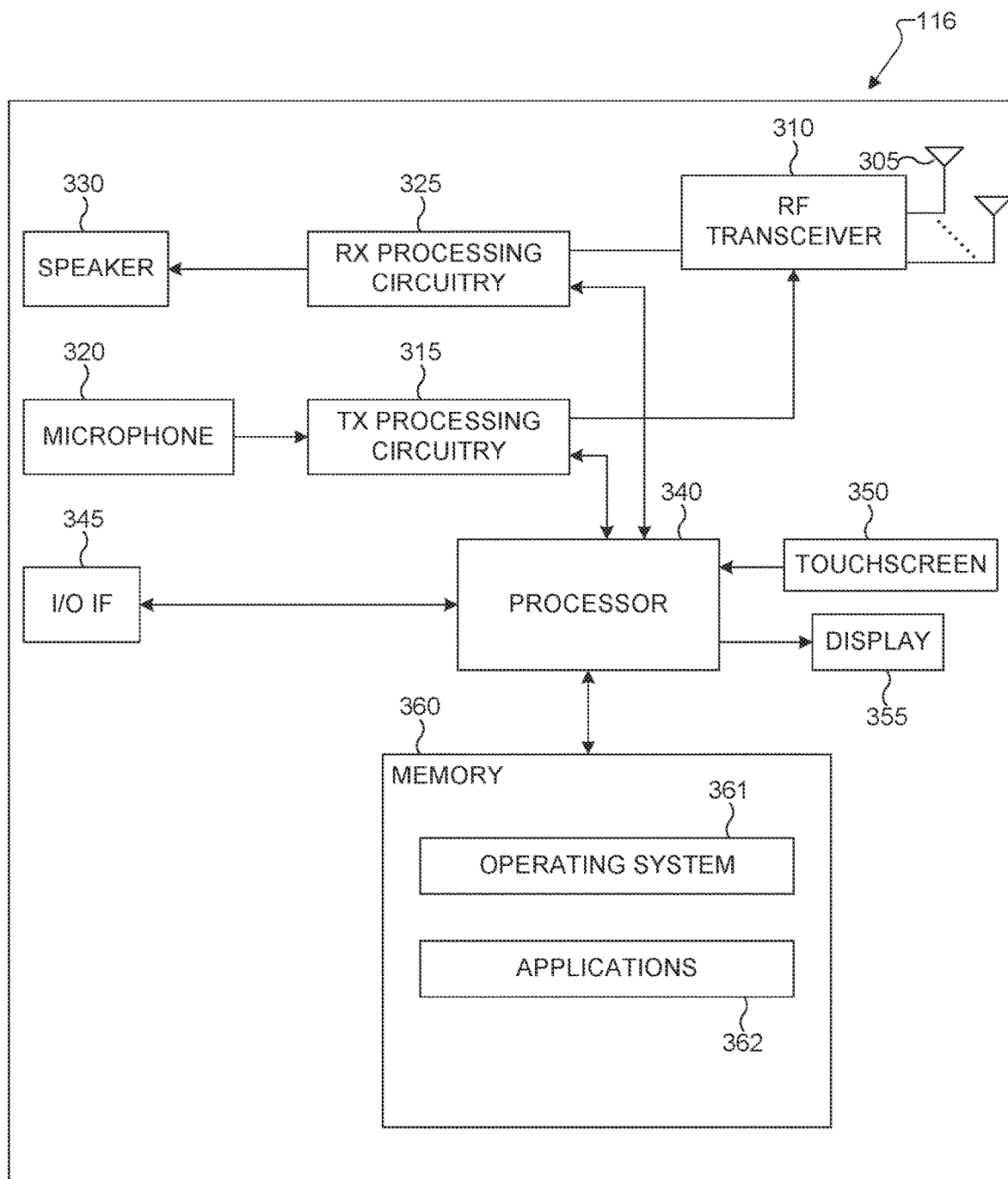
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for UEs. In certain embodiments, and one or more of the gNBs 101-103 includes circuitry, programing, or a combination thereof for UEs.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as RRC signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
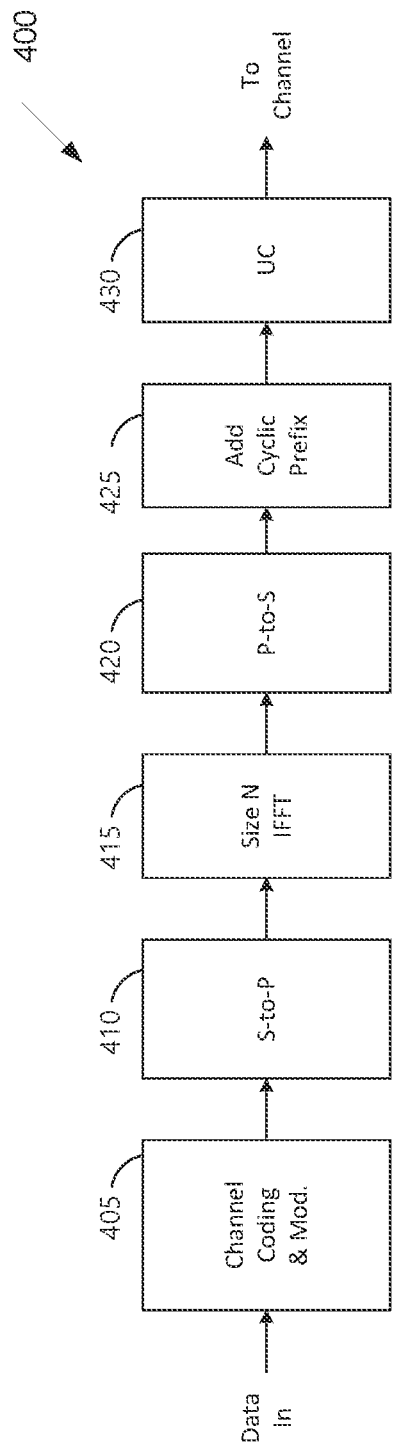
FIG. 4 illustrates an example DL slot structure according to embodiments of the present disclosure.
Figure 5:
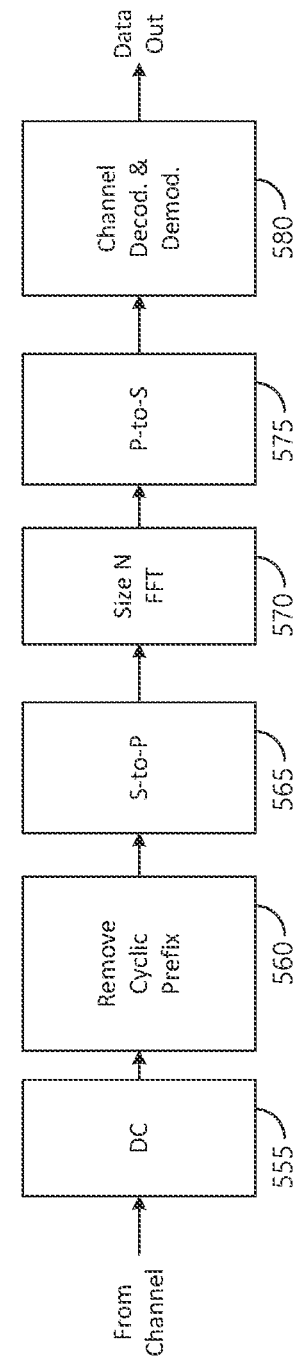
FIG. 5 illustrates an example UL slot structure for PUSCH transmission or PUCCH transmission according to embodiments of the present disclosure.

FIG. 4 and FIG. 5 illustrate example wireless transmit and receive paths according to this disclosure. In the following description, a transmit path 400 may be described as being implemented in an gNB (such as gNB 102), while a receive path 500 may be described as being implemented in a UE (such as UE 116). However, it may be understood that the receive path 500 can be implemented in an gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to gNBs 101-103 and may implement the receive path 500 for receiving in the downlink from gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure provides several components which can be used in conjunction or in combination with one another or can operate as standalone schemes.

The present disclosure provides the methodology for determining the subcarrier offset between from subcarrier 0 of a common resource grid to subcarrier 0 of an SS/PBCH block.

In this disclosure, the quantity $k_{SSB}$ is the subcarrier offset from subcarrier 0 in common resource block $N_{CRB}^{SSB}$ to subcarrier 0 of the SS/PBCH block, where $N_{CRB}^{SSB}$ is obtained from the higher-layer parameter offsetToPointA.

In this disclosure, the applicable carrier frequency range is at least for frequency range 1, wherein the type of SS/PBCH block is SS/PBCH block type A.

For operation without shared channel access, the 4 least significant bits of $k_{SSB}$ are given by the higher-layer parameter ssb-SubcarrierOffset, and the most significant bit of $k_{SSB}$ is given by $\bar{a}_{\bar{A}+5}$ in the PBCH payload.

Figure 6:
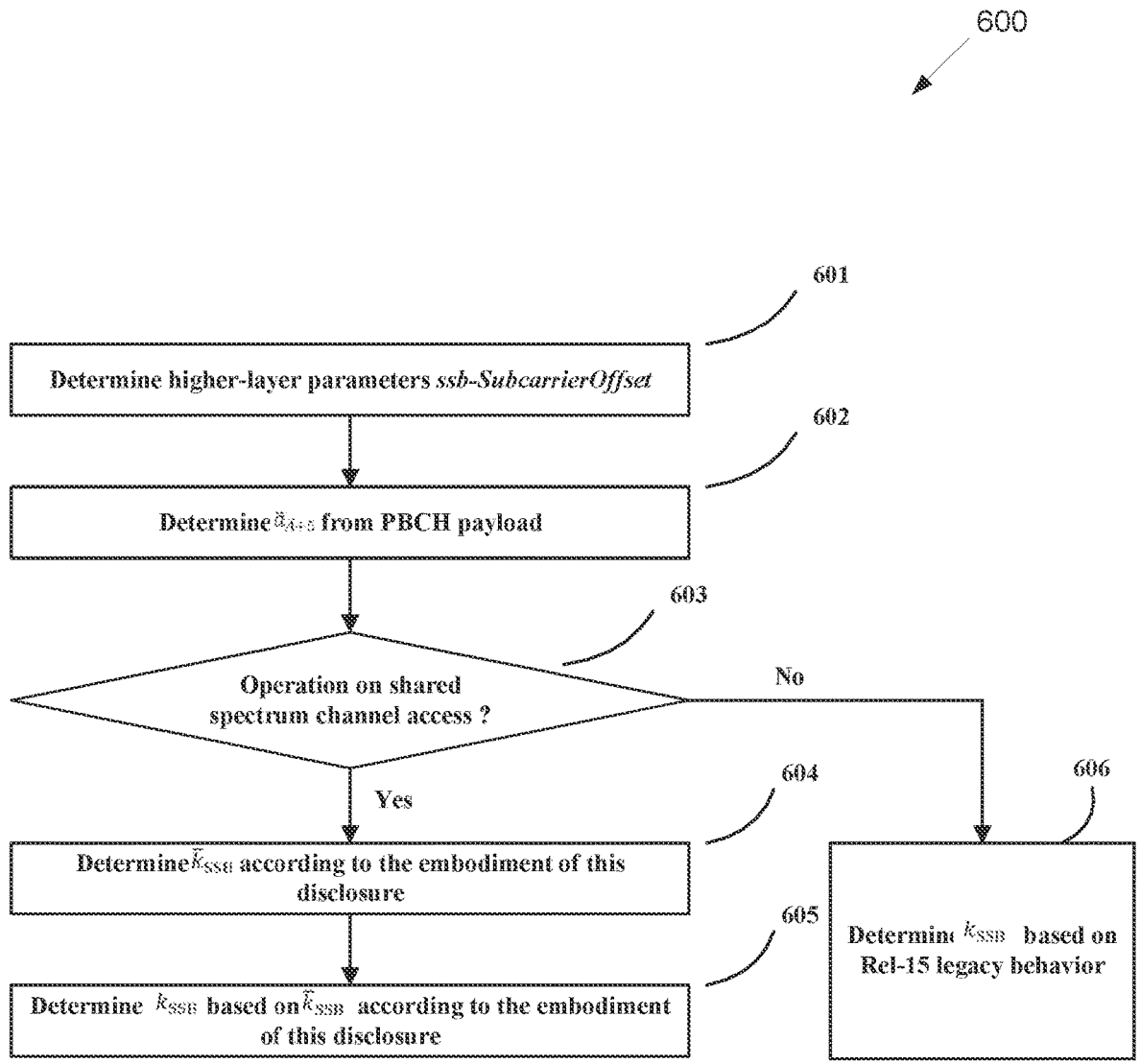
FIG. 6 illustrates a flowchart of a method for determining subcarrier offset according to embodiments of the present disclosure.

FIG. 6 illustrates a flowchart of a method 600 for determining subcarrier offset according to embodiments of the present disclosure, as may be performed by a UE (111-116 as illustrated in FIG. 1). An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, the method 600 begins at step 601. In step 601, the UE determines higher-layer parameters ssb-SubcarrierOffset. In step 602, the UE determines $\bar{a}_{\bar{A}+5}$ from PBCH payload. In step 603, the UE determines whether an operation on shared spectrum channel access is supported. In step 603, the operation is not supported, the UE in step 606 determines $k_{SSB}$ based on LTE Rel-15 legacy behaviour. In step 603, if the operation is supported, the UE in step 604 determines $\bar{k}_{SSB}$ according to embodiments provided in the present disclosure. In step 605, the UE determines $k_{SSB}$ based on $\bar{k}_{SSB}$ according to embodiments provided in the present disclosure.

In one embodiment, for operation with shared channel access, the 1st least significant bit of $k_{SSB}$ is 0, the 2nd to 4th least significant bits of $k_{SSB}$ are given by the 3 most significant bits of the higher-layer parameter ssb-SubcarrierOffset, and the most significant bit of $k_{SSB}$ is given by $\bar{a}_{\bar{A}+5}$ in the PBCH payload.

In one example, $k_{SSB}=2*\lfloor \bar{k}_{SSB}/2 \rfloor$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload.

In another embodiment, for operation with shared channel access, the 1st and 2nd least significant bit of $k_{SSB}$ are 0, the 3rd and 4th least significant bits of $k_{SSB}$ are given by the 2 most significant bits of the higher-layer parameter ssb-SubcarrierOffset, and the most significant bit of $k_{SSB}$ is given by $\bar{a}_{\bar{A}+5}$ in the PBCH payload.

In one example, $k_{SSB}=4*\lfloor \bar{k}_{SSB}/4 \rfloor$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload.

In yet another embodiment, for operation with shared channel access, the 1st least significant bit of $k_{SSB}$ is 0, the 2nd to 4th least significant bits of $k_{SSB}$ are given by the 3 most significant bits of the higher-layer parameter ssb-SubcarrierOffset.

In one example, $k_{SSB}=2*\lfloor k_{SSB}/2 \rfloor$ where $\bar{k}_{SSB}$ is given by the higher-layer parameter ssb-SubcarrierOffset.

In yet another embodiment, for operation with shared channel access, the 1st and 2nd least significant bit of $k_{SSB}$ are 0, the 3rd and 4th least significant bits of $k_{SSB}$ are given by the 2 most significant bits of the higher-layer parameter ssb-SubcarrierOffset.

In one example, $k_{SSB}=4*\lfloor k_{SSB}/4 \rfloor$ where $\bar{k}_{SSB}$ is given by the higher-layer parameter ssb-SubcarrierOffset.

In yet another embodiment, for operation with shared channel access, $k_{SSB}=\bar{k}_{SSB}$ if $\bar{k}_{SSB} \geq 24$, and $k_{SSB}=2*\lfloor \bar{k}_{SSB}/2 \rfloor$, if $\bar{k}_{SSB}<24$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload.

In such embodiment, if $\bar{k}_{SSB} \geq 24$, the 4 least significant bits of $k_{SSB}$ are given by the higher-layer parameter ssb-SubcarrierOffset, and the most significant bit of $\bar{k}_{SSB}$ is given by $\bar{a}_{\bar{A}}5$ in the PBCH payload; if $\bar{k}_{SSB}<24$, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 0, and the most significant bit of $\bar{k}_{SSB}$ is given by $\bar{a}_{\bar{A}+5}$ in the PBCH payload. An example procedure for determining $k_{SSB}$ from $\bar{k}_{SSB}$ is shown in FIG. 7A.

Figure 7A:
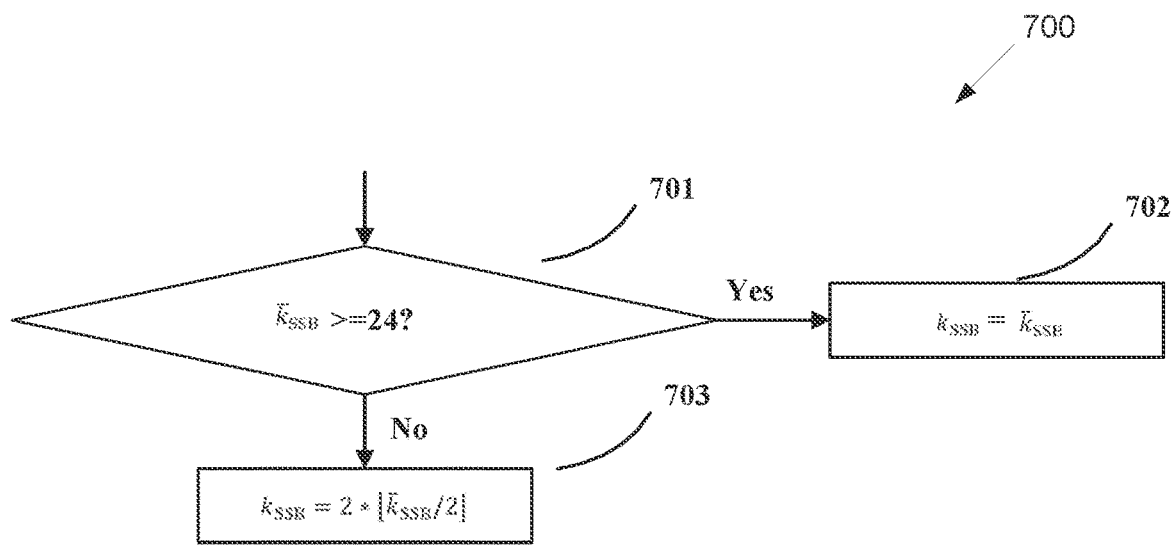
FIG. 7A illustrates a flowchart of a method for determining $k_{SSB}$ from $\overline{k}_{SSB}$ according to embodiments of the present disclosure.

FIG. 7A illustrates a flowchart of a method 700 for determining $k_{SSB}$ from $\bar{k}_{SSB}$ according to embodiments of the present disclosure, as may be performed by a UE (111-116 as illustrated in FIG. 1). An embodiment of the method 700 shown in FIG. 7A is for illustration only. One or more of the components illustrated in FIG. 7A can be implemented in specialized circuitry configured to perform the noted functions or one or more of the components can be implemented by one or more processors executing instructions to perform the noted functions.

As illustrated in FIG. 7A, the method 700 begins at step 701. In step 701, the UE determines whether $\bar{k}_{SSB} \geq 24$. In step 701, if $\bar{k}_{SSB} \geq 24$, the UE in step 702 determines that $k_{SSB}=\bar{k}_{SSB}$. In step 701, if $\bar{k}_{SSB}<24$, the UE determines that and $k_{SSB}=2*\lfloor \bar{k}_{SSB}/2 \rfloor$.

In yet another embodiment, for operation with shared channel access, $k_{SSB}=\bar{k}_{SSB}$ if $\bar{k}_{SSB} \geq 24$, and $k_{SSB}=2*\lfloor \bar{k}_{SSB}/2 \rfloor+k'_{SSB}$, if $\bar{k}_{SSB}<24$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload, and $k'_{SSB}=0$ if $(f_{SSB}-GSCN)/15$ kHz mod $2=0$; and $k'_{SSB}=1$ if $(f_{SSB}-GSCN)/15$ kHz mod $2=1$, wherein $f_{SSB}$ is the center frequency of the SS/PBCH block and a global synchronization channel number (GSCN) is the sync raster point (i.e., center of subcarrier 120 of the SS/BCH block).

In such embodiment, if $\bar{k}_{SSB} \geq 24$, the 4 least significant bits of $k_{SSB}$ are given by the higher-layer parameter ssb-SubcarrierOffset, and the most significant bit of $\bar{k}_{SSB}$ is given by $\bar{a}_{\bar{A}+5}$ in the PBCH payload; if $\bar{k}_{SSB}<24$ and $(f_{SSB}-GSCN)/15$ kHz mod $2=0$, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 0, and the most significant bit of $\bar{k}_{SSB}$ is given by $\bar{a}_{\bar{A}+5}$ in the PBCH payload; if $\bar{k}_{SSB}<24$ and $(f_{SSB}-GSCN)/15$ kHz mod $2=1$, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 1, and the most significant bit of $\bar{k}_{SSB}$ is given by $\bar{a}_{\bar{A}+5}$ in the PBCH payload; wherein $f_{SSB}$ is the center frequency of the SS/PBCH block and GSCN is the sync raster point (i.e., center of subcarrier 120 of the SS/BCH block). An example procedure for determining $k_{SSB}$ from $\bar{k}_{SSB}$ is shown in FIG. 7B.

Figure 7B:
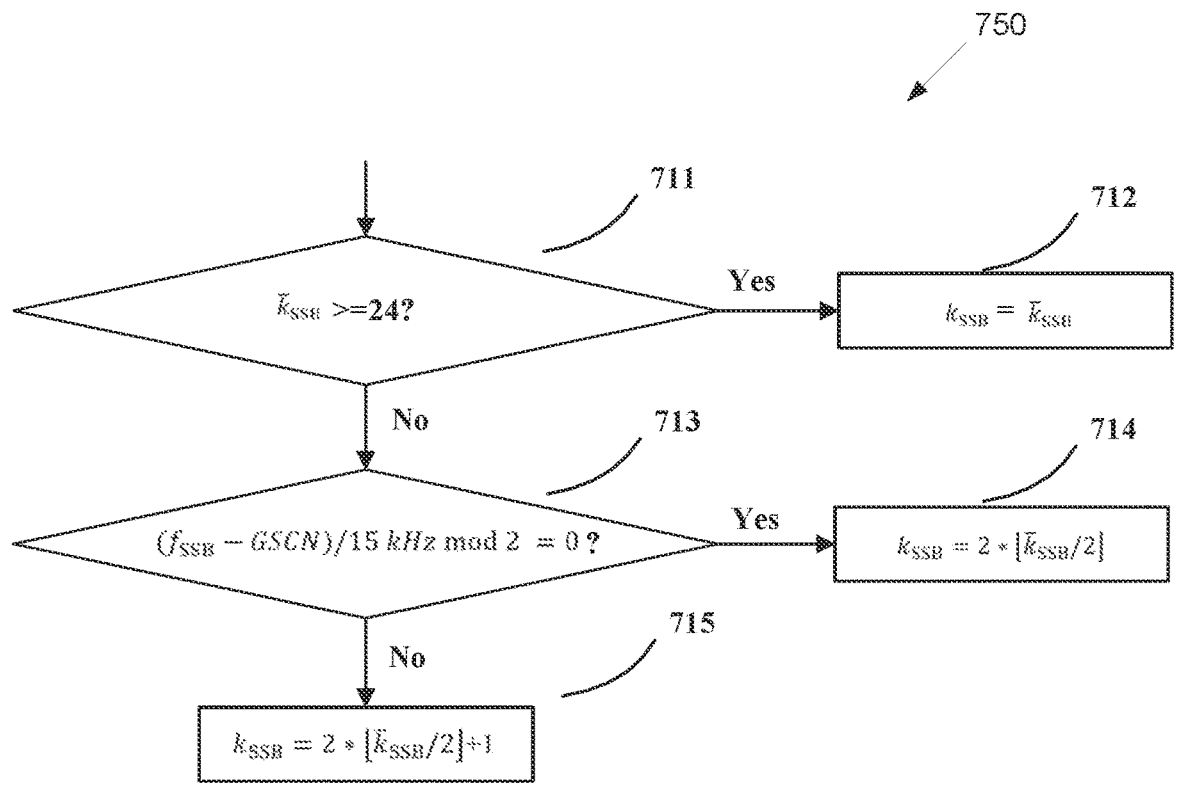
FIG. 7B illustrates another flowchart of a method for determining $k_{SSB}$ from $\overline{k}_{SSB}$ according to embodiments of the present disclosure.

FIG. 7B illustrates another flowchart of a method 750 for determining $k_{SSB}$ from $\bar{k}_{SSB}$ according to embodiments of the present disclosure, as may be performed by a UE (111-116 as illustrated in FIG. 1). An embodiment of the method 750 shown in FIG. 7B is for illustration only. One or more of the components illustrated in FIG. 7B can be implemented in specialized circuitry configured to perform the noted functions or one or more of the components can be implemented by one or more processors executing instructions to perform the noted functions.

As illustrated in FIG. 7B, the method 75— begins at step 711. In step 711, the UE determines whether $\bar{k}_{SSB} \geq 24$. In step 711, if $\bar{k}_{SSB} \geq 24$, the UE in step 712 determines that $k_{SSB}=\bar{k}_{SSB}$. In step 711, if $\bar{k}_{SSB}<24$, the UE in step 713 determines whether $(f_{SSB}\text{-GSCN})/15$ kHz mod 2=0. In step 713, if $(f_{SSB}\text{-GSCN})/15$ kHz mod 2=0, the UE in step 715 determines that $k_{SSB}=2*\lfloor k_{SSB}/2 \rfloor+1$.

In yet another embodiment, for operation with shared channel access, $k_{SSB}=\bar{k}_{SSB}$ if $\bar{k}_{SSB}\geq 24$, and $k_{SSB}=2*\lfloor \bar{k}_{SSB}/2 \rfloor+k'_{SSB}$, if $\bar{k}_{SSB}<24$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload, and $k'_{SSB}=0$ if $f_{SSB}/15$ kHz mod 2=0; and $k'_{SSB}=1$ if $f_{SSB}/15$ kHz mod 2=1, wherein $f_{SSB}$ is the center frequency of the SS/PBCH block (i.e., center of subcarrier 120 of the SS/PBCH block).

In such embodiment, if $\bar{k}_{SSB}\geq 24$, the 4 least significant bits of $k_{SSB}$ are given by the higher-layer parameter ssb-SubcarrierOffset, and the most significant bit of $\bar{k}_{SSB}$ is given by $\bar{a}_{\bar{A}+5}$ in the PBCH payload; if $\bar{k}_{SSB}<24$ and $f_{SSB}/15$ kHz mod 2=0, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 0, and the most significant bit of $\bar{k}_{SSB}$ is given by $\bar{a}_{\bar{A}+5}$ in the PBCH payload; if $\bar{k}_{SSB}<24$ and $f_{SSB}/15$ kHz mod 2=1, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 1, and the most significant bit of $\bar{k}_{SSB}$ is given by $\bar{a}_{\bar{A}+5}$ in the PBCH payload; wherein $f_{SSB}$ is the center frequency of the SS/PBCH block (SSB) and GSCN is the sync raster point (i.e., center of subcarrier 120 of the SS/BCH block). An example procedure for determining $k_{SSB}$ from $\bar{k}_{SSB}$ is shown in FIG. 7C.

Figure 7C:
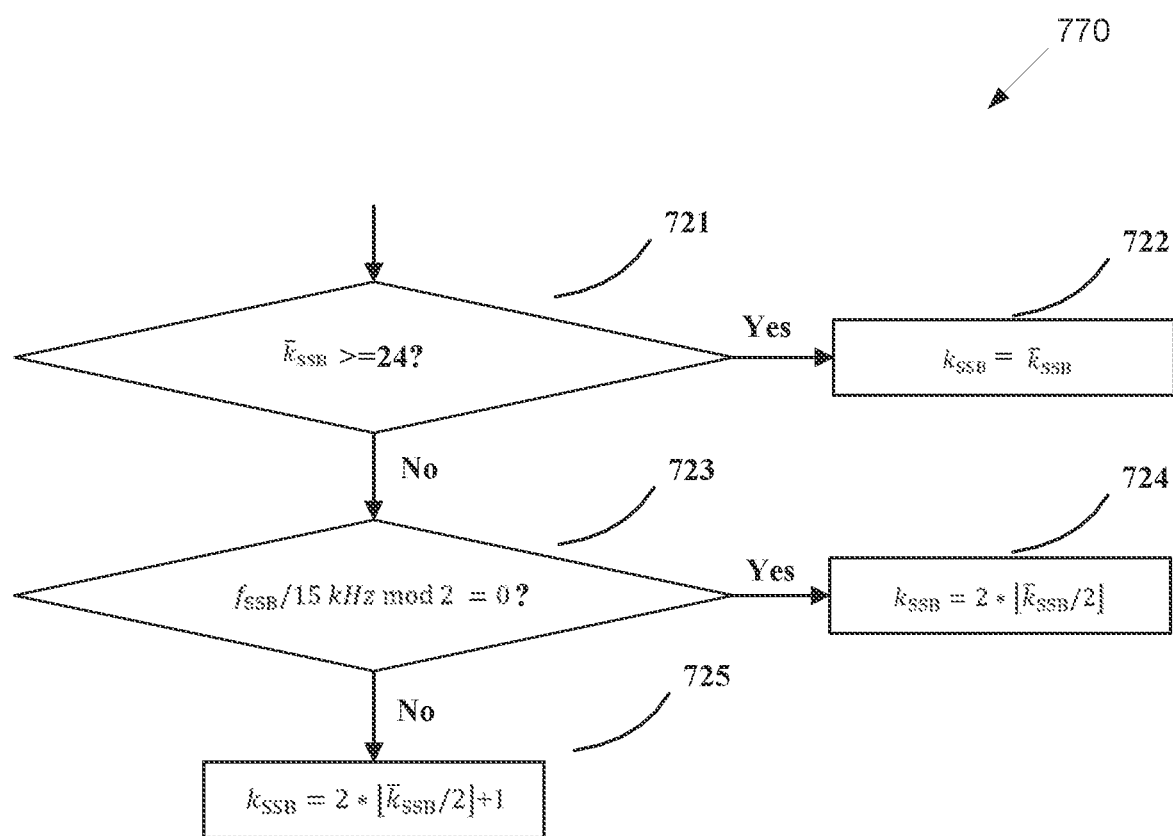
FIG. 7C illustrates yet another flowchart of a method for determining $k_{SSB}$ from $\overline{k}_{SSB}$ according to embodiments of the present disclosure.

FIG. 7C illustrates yet another flowchart of a method 770 for determining $k_{SSB}$ from $\bar{k}_{SSB}$ according to embodiments of the present disclosure, as may be performed by a UE (111-116 as illustrated in FIG. 1). An embodiment of the method 770 shown in FIG. 7C is for illustration only. One or more of the components illustrated in FIG. 7C can be implemented in specialized circuitry configured to perform the noted functions or one or more of the components can be implemented by one or more processors executing instructions to perform the noted functions.

As illustrated in FIG. 7C, the method 770 begins at step 721. In step 721, the UE determines whether $\bar{k}_{SSB}\geq 24$. In step 721, if $\bar{k}_{SSB}>24$, the UE in step 722 determines that $k_{SSB}=\bar{k}_{SSB}$. In step 721, if $\bar{k}_{SSB}<24$, the UE in step 723 determines whether $f_{SSB}/15$ kHz mod 2=0. In step 723, if $f_{SSB}/15$ kHz mod 2=0, the UE in step 725 determines that $k_{SSB}=2*\lfloor \bar{k}_{SSB}/2 \rfloor+1$.

In yet another embodiment, for operation with shared channel access, $k_{SSB}=\bar{k}_{SSB}$ if $\bar{k}_{SSB}\geq 24$, and $k_{SSB}=2*\lfloor \bar{k}_{SSB}/2 \rfloor+k'_{SSB}$, if $\bar{k}_{SSB}<24$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload, and $k'_{SSB}=0$ if $f_{SSB}/15$ kHz mod 2=0; and $k'_{SSB}=1$ if $f_{SSB}/15$ kHz mod 2=1, wherein $f_{SSB}$ is the center of subcarrier 0 of the SS/PBCH block.

In such embodiment, if $\bar{k}_{SSB}\geq 24$, the 4 least significant bits of $k_{SSB}$ are given by the higher-layer parameter ssb-SubcarrierOffset, and the most significant bit of $\bar{k}_{SSB}$ is given by $\bar{a}_{\bar{A}+5}$ in the PBCH payload; if $\bar{k}_{SSB}<24$ and $f_{SSB}/15$ kHz mod 2=0, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 1, and the most significant bit of $\bar{k}_{SSB}$ is given by $\bar{a}_{\bar{A}+5}$ in the PBCH payload; wherein $f_{SSB}$ is the center of subcarrier 0 of the SS/PBCH block. An example procedure for determining $k_{SSB}$ from $\bar{k}_{SSB}$ is shown in FIG. 7C.

In yet another embodiment, for operation with shared channel access, $k_{SSB}=\bar{k}_{SSB}$ if $\bar{k}_{SSB}\geq 24$, and $k_{SSB}=2*\lfloor \bar{k}_{SSB}/2 \rfloor+k'_{SSB}$, if $\bar{k}_{SSB}<24$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload, and $k'_{SSB}=0$ if $f_{SSB}/15$ kHz mod 2=0; and $k'_{SSB}=1$ if $f_{SSB}/15$ kHz mod 2=1, wherein $f_{SSB}$ is the center of subcarrier 239 of the SS/PBCH block.

In such embodiment, if $\bar{k}_{SSB}\geq 24$, the 4 least significant bits of $k_{SSB}$ are given by the higher-layer parameter ssb-SubcarrierOffset, and the most significant bit of $\bar{k}_{SSB}$ is given by $\bar{a}_{\bar{A}5}$ in the PBCH payload; if $\bar{k}_{SSB}<24$ and $f_{SSB}/15$ kHz mod 2=0, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 0, and the most significant bit of $\bar{k}_{SSB}$ is given by $\bar{a}_{\bar{A}+5}$ in the PBCH payload; if $\bar{k}_{SSB}<24$ and $f_{SSB}/15$ kHz mod 2=1, the 4th, 3rd, and 2nd least significant bits (e.g., 2nd, 3rd, and 4th most significant bits) of $k_{SSB}$ are given by 1st, 2nd, and 3rd most significant bits of the higher-layer parameter ssb-SubcarrierOffset, respectively, the 1st least significant bit of $k_{SSB}$ is given by 1, and the most significant bit of $\bar{k}_{SSB}$ is given by $\bar{a}_{\bar{A}+5}$ in the PBCH payload; wherein $f_{SSB}$ is the center of subcarrier 239 of the SS/PBCH block. An example procedure for determining $k_{SSB}$ from $\bar{k}_{SSB}$ is shown in FIG. 7C.

In yet another embodiment, for operation with shared channel access, the 1st least significant bit of $k_{SSB}$ is 0, the 2nd to 4th least significant bits of $k_{SSB}$ are given by the 3 most significant bits of the higher-layer parameter ssb-SubcarrierOffset, and the most significant bit of $k_{SSB}$ is given by $\bar{a}_{\bar{A}+5}$ in the PBCH payload.

In one example, $k_{SSB}=2*\lfloor \bar{k}_{SSB}/2 \rfloor$, if $\bar{k}_{SSB}<24$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload. For this embodiment, the SS/PBCH block type is with $\mu\in\{0, 1\}$, and $k_{SSB}\in\{0, 2, \ldots, 22\}$ expressed in term of the sub-carrier spacing (SCS) of 15 kHz.

In yet another embodiment, for operation with shared channel access, $k_{SSB}=\bar{k}_{SSB}$ if $\bar{k}_{SSB}\geq 24$, and $k_{SSB}=4*\lfloor \bar{k}_{SSB}/4 \rfloor$, if $\bar{k}_{SSB}<24$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload.

In yet another embodiment, for operation with shared channel access, the 1st to 3rd least significant bits of $k_{SSB}$ are given by the 3 most significant bits of the higher-layer parameter ssb-SubcarrierOffset, and the most significant bit of $k_{SSB}$ is given by $\bar{a}_{\bar{A}+5}$ in the PBCH payload.

In one example, $k_{SSB}=\lfloor \bar{k}_{SSB}/2 \rfloor$ where the 4 least significant bits of $\bar{k}_{SSB}$ are given by the higher-layer parameter ssb-SubcarrierOffset, and the most significant bit of $\bar{k}_{SSB}$ is given by $\bar{a}_{\bar{A}+5}$ in the PBCH payload. For this embodiment, a new SS/PBCH block type needs to be defined (e.g., denoted as SS/PBCH block type C), where $\mu\in\{0,1\}$, and $k_{SSB}\in$ $\{0, 1, \ldots, 11\}$ or $k_{SSB} \in \{0, 1, \ldots, 15\}$ expressed in term of the SCS same as SS/PBCH block.

In yet another embodiment, for operation with shared channel access, $k_{SSB} = \bar{k}_{SSB}$ if $\bar{k}_{SSB} \geq 12$, and $k_{SSB} = 2 \cdot \lfloor \bar{k}_{SSB}/2 \rfloor$, if $\bar{k}_{SSB} < 12$ where the 4 least significant bits of $\bar{k}_{SSB}$ are given by the higher-layer parameter ssb-SubcarrierOffset. For this embodiment, the SS/PBCH block type is with $\mu \in \{0,1\}$, and $k_{SSB} \in \{0, 1, \ldots, 15\}$ expressed in term of the SCS same as SS/PBCH block.

In yet another embodiment, for operation with shared channel access, $k_{SSB} = \bar{k}_{SSB}$ if $\bar{k}_{SSB} \geq 12$, and $k_{SSB} = 4 \cdot \lfloor \bar{k}_{SSB}/4 \rfloor$, if $\bar{k}_{SSB} < 12$ where the 4 least significant bits of $\bar{k}_{SSB}$ are given by the higher-layer parameter ssb-SubcarrierOffset. For this embodiment, the SS/PBCH block type is with $\mu \in \{0,1\}$, and $k_{SSB} \in \{0, 1, \ldots, 15\}$ expressed in term of the SCS same as SS/PBCH block.

As illustrated in FIG. 6, $k_{SSB}$ is determined from $\bar{k}_{SSB}$ (e.g., 605 in the example UE procedure for determining subcarrier offset, as shown in FIG. 6) is shown in FIGS. 7A, 7B, and 7C.

In one embodiment, according to the at least one embodiment for determining $k_{SSB}$ in this disclosure, at least one bit from ssb-SubcarrierOffset can be saved for other purpose.

In one example, the LSB of ssb-SubcarrierOffset can be combined with subCarrierSpacingCommon to indicate a parameter for deriving a quasi co-locate (QCL) assumption of SS/PBCH blocks, e.g., denoted as $N_{SSB}^{QCL}$, according to TABLE 1.

In one instance, the approach is applicable only for $k_{SSB} < 24$.

TABLE 1

Mapping between the combination of subCarrierSpacingCommon and LSB of ssb-SubcarrierOffset to $N_{SSB}^{QCL}$

| subCarrierSpacingCommon | LSB of ssb-SubcarrierOffset | $N_{SSB}^{QCL}$ |
|---|---|---|
| scs15or60 | 0 | 1 |
| scs15or60 | 1 | 2 |
| scs30or120 | 0 | 4 |
| scs30or120 | 1 | 8 |

In one embodiment, for embodiment in this disclosure with $k_{SSB} \in \{0, 1, \ldots, 15\}$ expressed in term of the SCS same as SS/PBCH block, for operation with shared spectrum channel access, the interpretation of $k_{SSB} \in \{12, 13, 14, 15\}$ follows the interpretation of $k_{SSB}$ in a frequency range 2 (FR2).

In one example, if a UE detects a first SS/PBCH block and determines that a control resource set (CORESET) for Type0-PDCCH common search space (CSS) set is not present, and for $12 \leq k_{SSB} \leq 13$ for operation with shared spectrum channel access, the UE may determine the nearest (in the corresponding frequency direction) GSCN of a second SS/PBCH block having a CORESET for an associated Type0-PDCCH CSS set as $N_{GSCN}^{Reference} + N_{GSCN}^{Offset}$. If the UE detects the second SS/PBCH block and the second SS/PBCH block does not provide a CORESET for Type0-PDCCH CSS set, the UE may ignore the information related to GSCN of SS/PBCH block locations for performing cell search.

If a UE detects a SS/PBCH block and determines that a CORESET for Type0-PDCCH CSS set is not present, and for $k_{SSB} = 15$ for operation with shared spectrum channel access, the UE determines that there is no SS/PBCH block having an associated Type0-PDCCH CSS set within a GSCN range $[N_{GSCN}^{Reference} - N_{GSCN}^{Start}, N_{GSCN}^{End}]$. $N_{GSCN}^{Start}$ and $N_{GSCN}^{End}$ are respectively determined by controlResourceSetZero and searchSpaceZero in pdcch-ConfigSIB1.

The present disclosure provides a mechanism and methodology for CSI-RS validation for an operation with shared spectrum channel access. The present disclosure includes the following components: CSI-RS validation based on SS/PBCH block; CSI-RS validation based on PDCCH of remaining minimum system information (RMSI); CSI-RS validation based on PDSCH of RMSI; CSI-RS validation based on PDCCH/PDSCH in general; and CSI-RS validation based on another CSI-RS triggered by DCI.

For operation with shared spectrum channel access, a discovery burst transmission window (DBTW) is supported to allow more opportunities for the transmission of discovery burst due to uncertain channel access, wherein the discovery burst include a burst of SS/PBCH blocks, and PDCCH/PDSCH of RMSI and CSI-RS if configured. A parameter, denoted as $N_{SSB}^{QCL}$, for deriving QCL assumption of SS/PBCH blocks within and across the DBTW is indicated to the UE, such that the SS/PBCH blocks with candidate SS/PBCH block index $\bar{I}_{SSB}$ are quasi co-located (QCLed), if $\bar{I}_{SSB}$ mod $N_{SSB}^{QCL}$ is the same for those SS/PBCH blocks. An illustration of the DBTW and the QCL assumption within the DBTW is shown in FIG. 8.

Figure 8:
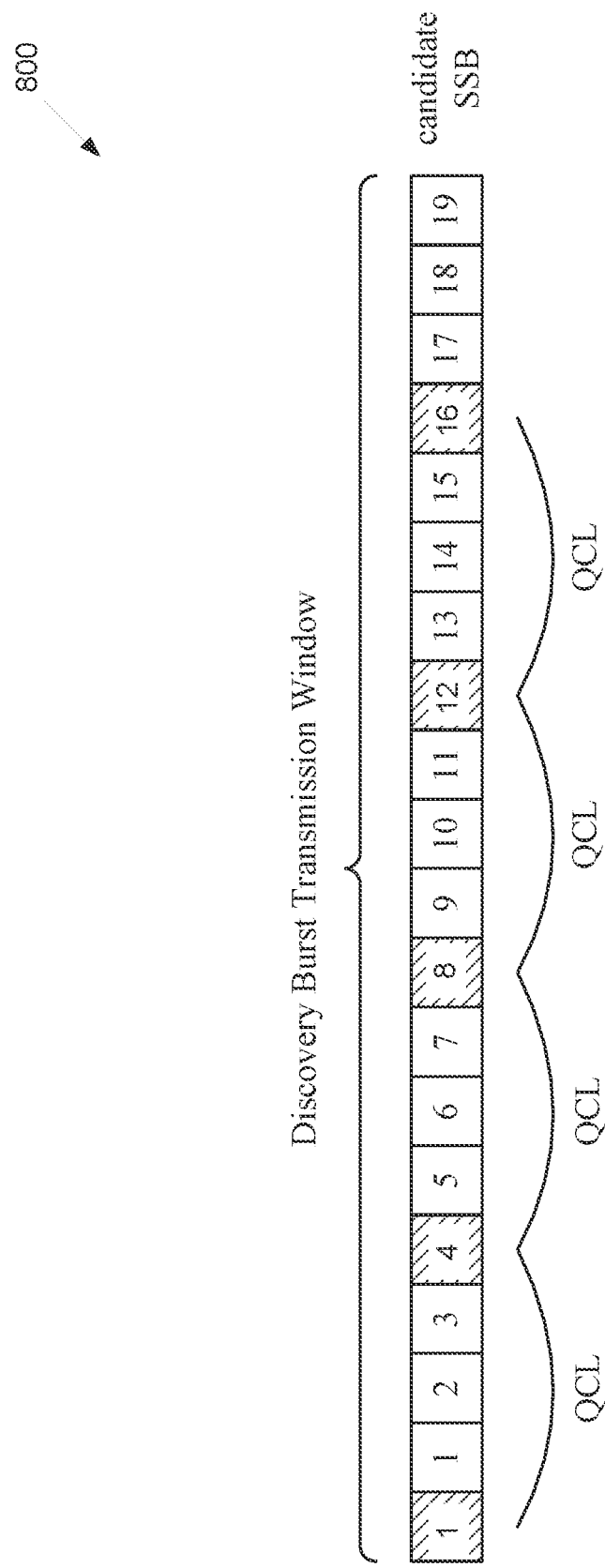
FIG. 8 illustrates an example DBTW and QCL assumption in the window according to embodiments of the present disclosure.

FIG. 8 illustrates an example DBTW and QCL assumption in the window 800 according to embodiments of the present disclosure. An embodiment of the DBTW and QCL assumption in the window 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

A CSI-RS can also be configured as part of discovery burst. According to the configured time domain resources for the CSI-RS, the UE is able to determine whether the CSI-RS is located in a DBTW. In particular, the CSI-RS can be further configured to be QCLed with a SS/PBCH block, or further configured to be associated with a SS/PBCH block if the CSI-RS is for RRM measurement.

Due to potential failure of channel access, the intended transmission of a CSI-RS may not actually take place. Mechanism indicating UE the transmission of CSI-RS or not may be supported, in addition to the ones supported for operation without shared spectrum channel access.

The present disclosure provides several components which can be used in conjunction or in combination with another or can operate as standalone schemes.

In one example, at least one of the approaches of this disclosure is applicable to the case where the set of symbols of a slot configured by higher layer parameters to receive CSI-RS are indicated to a UE as flexible by tdd-UL-DL-ConfigurationCommon, or tdd-UL-DL-ConfigurationDedicated.

In another example, at least one of the approaches of this disclosure is applicable to the case where the set of symbols of a slot configured by higher layer parameters to receive CSI-RS are not provided with information from tdd-UL-DL-ConfigurationCommon and tdd-UL-DL-ConfigurationDedicated.

In yet another example, at least one of the approaches of this disclosure is applicable to the case where the of symbols of a slot configured by higher layer parameters to receive CSI-RS are within the channel occupancy, if the channel occupancy is provided by the DCI format 2_0.

In yet another example, at least one of the approaches of this disclosure is applicable to the case where the of symbols of a slot configured by higher layer parameters to receive CSI-RS are not within the channel occupancy, if the channel occupancy is provided by the DCI format 2_0.

In yet another example, at least one of the approaches of this disclosure is applicable to the case where the of symbols of a slot configured by higher layer parameters to receive CSI-RS are within the discovery burst transmission window.

In yet another example, at least one of the approaches of this disclosure is applicable according to the configuration of a higher layer parameter. For example, the at least one of the approaches of this disclosure is applicable if the higher layer parameter is provided, otherwise, NR Rel-15 CSI-RS validation is applicable.

In one embodiment, a SS/PBCH block can be used for validation of the transmission of a CSI-RS.

Figure 9:
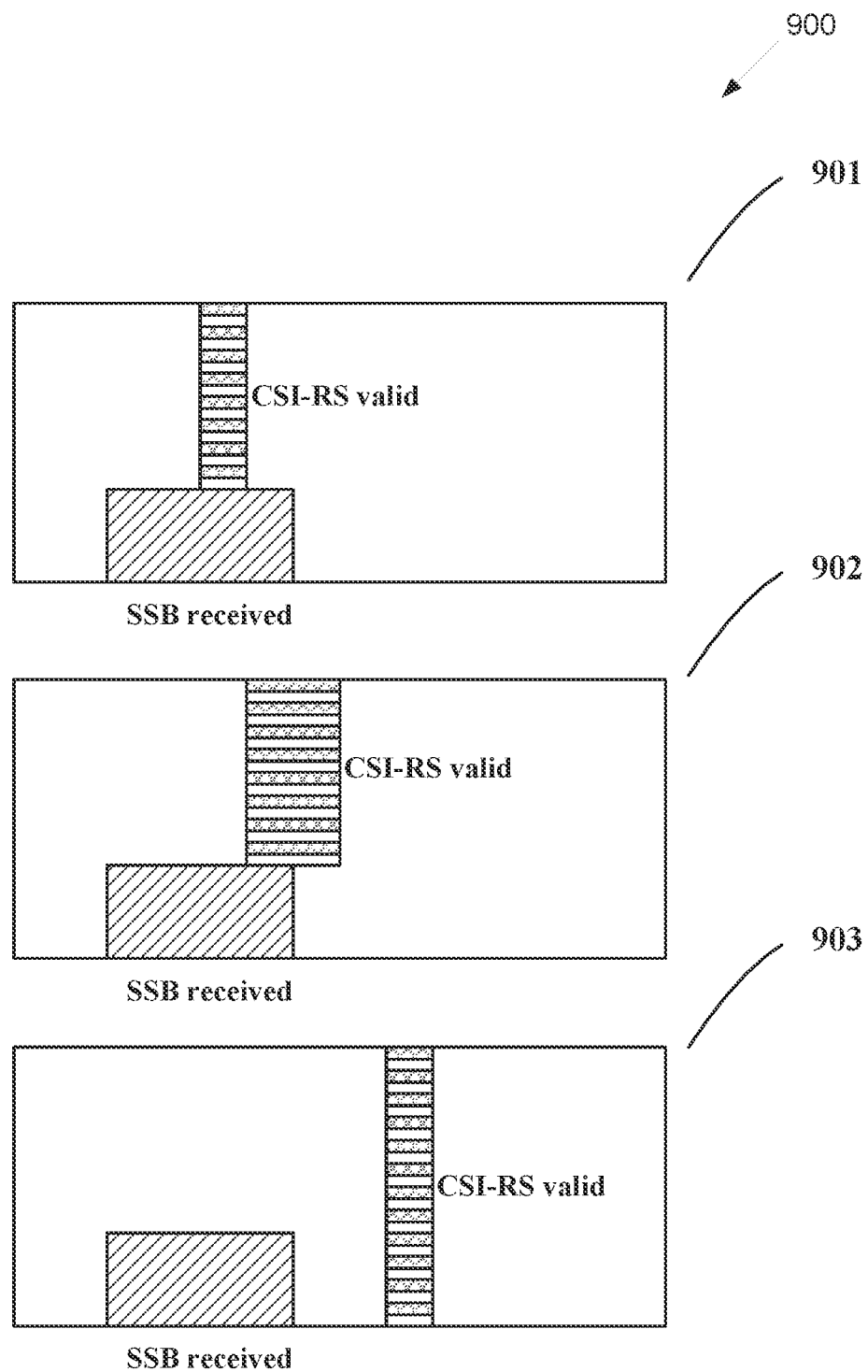
FIG. 9 illustrates an example CSI-RS validation based on SS/PBCH block according to embodiments of the present disclosure.

FIG. 9 illustrates an example CSI-RS validation based on SS/PBCH block 900 according to embodiments of the present disclosure. An embodiment of the CSI-RS validation based on SS/PBCH block 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

In one example, for a set of symbols of a slot configured by higher layer parameters to receive CSI-RS, if the UE detects the set of symbols of the slot are included in the symbols for a received SS/PBCH block, the UE receives the CSI-RS. This example is illustrated in FIG. 9 (e.g., 901).

In one example, at least one of the following conditions for this example is provided. In one instance of a first condition, the UE is indicated that the set of symbols in the slot are within the channel occupancy. In one instance of a second condition, the CSI-RS is configured to be QCLed with the received SS/PBCH blocks. In one instance of a third condition, the CSI-RS is configured to be associated with the SS/PBCH block with SS/PBCH block index same as the received SS/PBCH block.

In another example, for a set of symbols of a slot configured by higher layer parameters to receive CSI-RS, if the UE detects the set of symbols of the slot overlaps with the symbols for a received SS/PBCH block, the UE receives the CSI-RS. This example is illustrated in FIG. 9 (e.g., 902).

In one example, at least one of the following conditions is provide. In one instance of a first condition, the UE is indicated that the set of symbols in the slot are within the channel occupancy. In one instance of a second condition, the CSI-RS is configured to be QCLed with the received SS/PBCH blocks. In one instance of a third condition, the CSI-RS is configured to be associated with the SS/PBCH block with SS/PBCH block index same as the received SS/PBCH block. In one instance of a fourth condition, the UE is not indicated to transmit PUSCH, PUCCH, physical random access channel (PRACH), or sounding reference signal (SRS) in the set of symbols of the slot.

In yet another example, for a set of symbols of a slot configured by higher layer parameters to receive CSI-RS, if the UE receives a SS/PBCH block within the slot, the UE receives the CSI-RS. This example is illustrated in FIG. 9 (e.g., 903).

In one example, at least one of the following conditions is provide. In one instance of a first condition, the UE is indicated that the set of symbols in the slot are within the channel occupancy. In one instance of a second condition, the CSI-RS is configured to be QCLed with the received SS/PBCH blocks. In one instance of a third condition, the CSI-RS is configured to be associated with the SS/PBCH block with SS/PBCH block index same as the received SS/PBCH block. In one instance of a fourth condition, the UE is not indicated to transmit PUSCH, PUCCH, PRACH, or SRS in the set of symbols of the slot.

Figure 10:
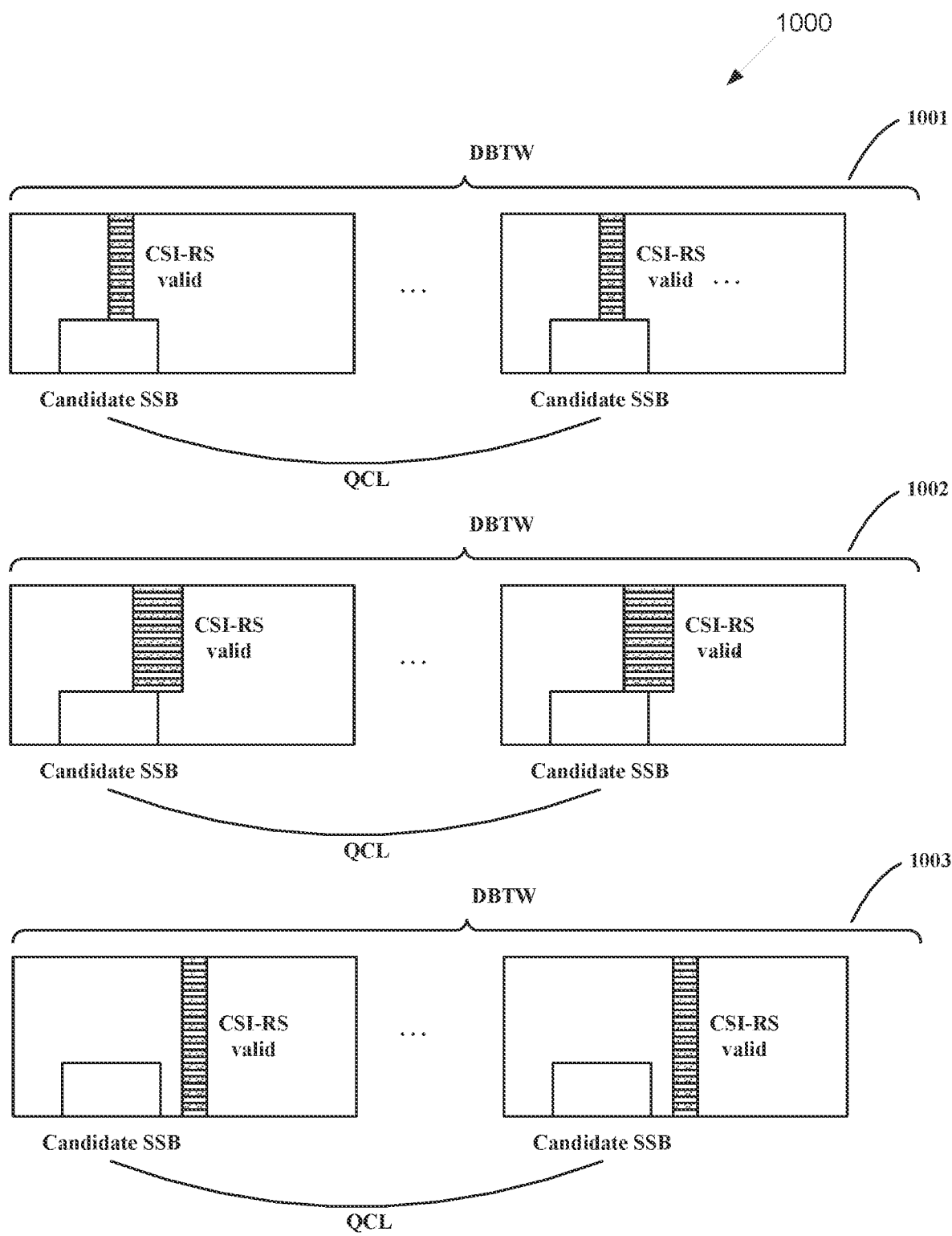
FIG. 10 illustrates another example CSI-RS validation based on SS/PBCH block according to embodiments of the present disclosure.

FIG. 10 illustrates another example CSI-RS validation based on SS/PBCH block 1000 according to embodiments of the present disclosure. An embodiment of the CSI-RS validation based on SS/PBCH block 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In one example, for a set of symbols of a slot configured by higher layer parameters to receive CSI-RS, if the UE detects the set of symbols of the slot are included in the symbols for a SS/PBCH block in a DBTW, the UE receives the CSI-RS, wherein the SS/PBCH block has the candidate SS/PBCH block index corresponding to a SS/PBCH block index provided by ssb-PositionsInBurst. This example is illustrated in FIG. 10 (e.g., 1001).

In one example, at least one of the following conditions for this example is provided. In one instance of a first condition, the UE is indicated that the set of symbols in the slot are within the channel occupancy. In one instance of a second condition, the CSI-RS is configured to be QCLed with the SS/PBCH blocks. In one instance of a third condition, the CSI-RS is configured to be associated with the SS/PBCH blocks. In one instance of a fourth condition, the UE is not indicated to transmit PUSCH, PUCCH, PRACH, or SRS in the set of symbols of the slot.

In another example, for a set of symbols of a slot configured by higher layer parameters to receive CSI-RS, if the UE detects the set of symbols of the slot overlaps with the symbols for a SS/PBCH block in a DBTW, the UE receives the CSI-RS, wherein the SS/PBCH block has the candidate SS/PBCH block index corresponding to a SS/PBCH block index provided by ssb-PositionsInBurst. This example is illustrated in FIG. 10 (e.g., 1002).

In one example, at least one of the following conditions for this example is provided. In one instance of a first condition, the UE is indicated that the set of symbols in the slot are within the channel occupancy. In one instance of a second condition, the CSI-RS is configured to be QCLed with the SS/PBCH blocks. In one instance of a third condition, the CSI-RS is configured to be associated with the SS/PBCH blocks. In one instance of a fourth condition, the UE is not indicated to transmit PUSCH, PUCCH, PRACH, or SRS in the set of symbols of the slot.

In yet another example, for a set of symbols of a slot configured by higher layer parameters to receive CSI-RS, if the UE detects the slot contains a SS/PBCH block in a DBTW, the UE receives the CSI-RS, wherein the SS/PBCH block has the candidate SS/PBCH block index corresponding to a SS/PBCH block index provided by ssb-PositionsInBurst. This example is illustrated in FIG. 10 (e.g., 1003).

In one example, at least one of the following conditions for this example is provided. In one instance of a first condition, the UE is indicated that the set of symbols in the slot are within the channel occupancy. In one instance of a second condition, the CSI-RS is configured to be QCLed with the SS/PBCH blocks. In one instance of a third condition, the CSI-RS is configured to be associated with the SS/PBCH blocks. In one instance of a fourth condition, the UE is not indicated to transmit PUSCH, PUCCH, PRACH, or SRS in the set of symbols of the slot.

Figure 11:
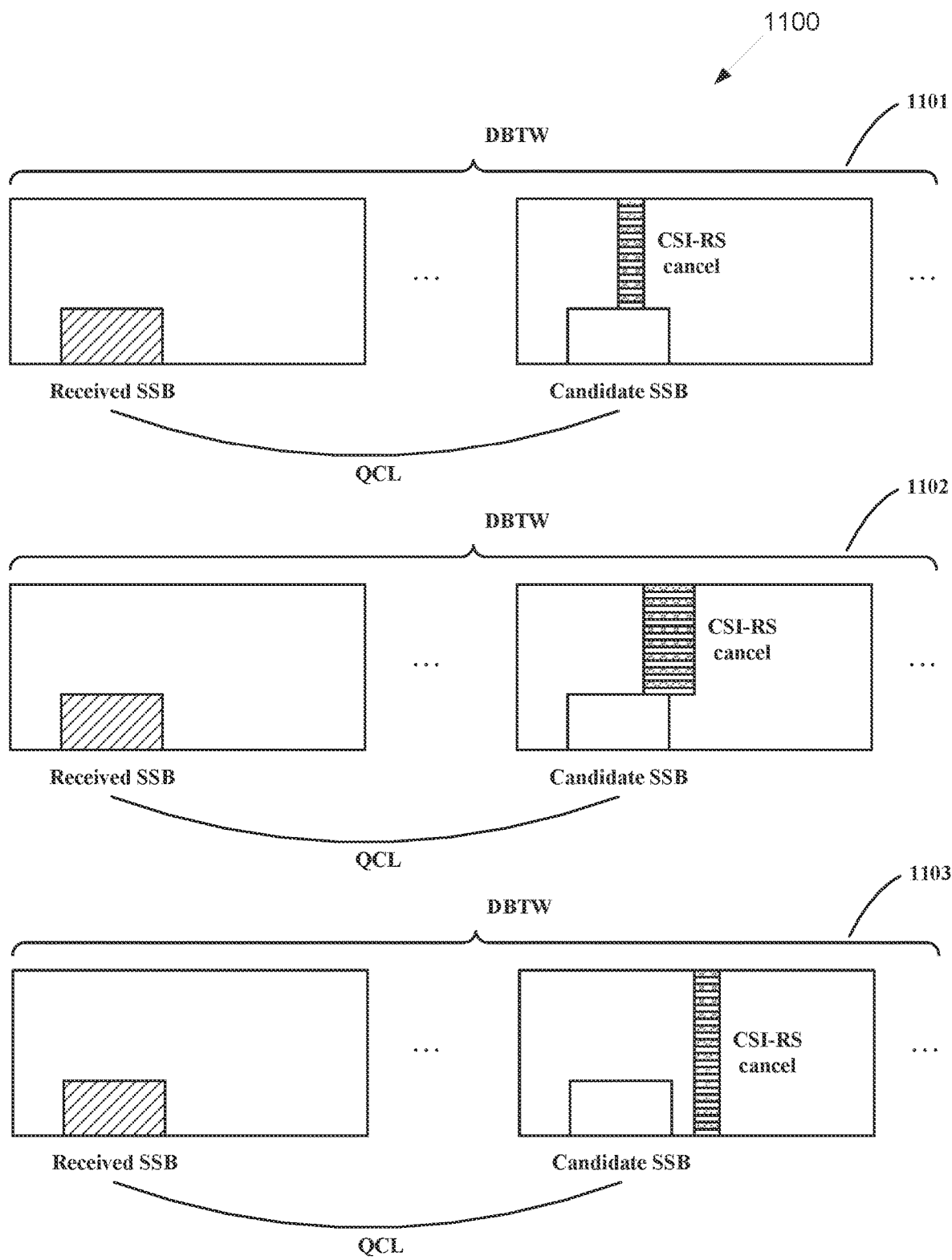
FIG. 11 illustrates yet another example CSI-RS validation based on SS/PBCH block according to embodiments of the present disclosure.

FIG. 11 illustrates yet another example CSI-RS validation based on SS/PBCH block 1100 according to embodiments of the present disclosure. An embodiment of the CSI-RS validation based on SS/PBCH block 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In one example, for a set of symbols of a slot configured by higher layer parameters to receive CSI-RS, if the UE detects a first SS/PBCH block in a DBTW, and the set of symbols of a slot for receiving CSI-RS are included in the symbols for a second SS/PBCH block, wherein the second SS/PBCH block is within the same DBTW as the first SS/PBCH block and QCLed with the first SS/PBCH block, then the UE cancels the reception of CSI-RS. This example is illustrated in FIG. 11 (e.g. 1101).

In one example, at least one of the following conditions for this example is provided. In one instance of a first condition, the UE is not indicated to receive PDCCH, PDSCH, or CSI-RS on the set of symbols in the slot. In one instance of a second condition, the UE is indicated that the set of symbols in the slot are within the channel occupancy. In one instance of a third condition, the CSI-RS is configured to be QCLed with the first and second SS/PBCH blocks. In one instance of fourth condition, the CSI-RS is configured to be associated with the SS/PBCH block with SS/PBCH block index same as the first SS/PBCH block.

In another example, for a set of symbols of a slot configured by higher layer parameters to receive CSI-RS, if the UE detects a first SS/PBCH block in a DBTW, and the set of symbols of a slot for receiving CSI-RS overlaps with the symbols for a second SS/PBCH block, wherein the second SS/PBCH block is within the same DBTW as the first SS/PBCH block and QCLed with the first SS/PBCH block, then the UE cancels the reception of CSI-RS. This example is illustrated in FIG. 11 (e.g., 1102).

In one example, at least one of the following conditions for this example is provided. In one instance of a first condition, the UE is not indicated to receive PDCCH, PDSCH, or CSI-RS on the set of symbols in the slot. In one instance of a second condition, the UE is indicated that the set of symbols in the slot are within the channel occupancy. In one instance of a third condition, the CSI-RS is configured to be QCLed with the first and second SS/PBCH blocks. In one instance of a fourth condition, the CSI-RS is configured to be associated with the SS/PBCH block with SS/PBCH block index same as the first SS/PBCH block.

In yet another example, for a set of symbols of a slot configured by higher layer parameters to receive CSI-RS, if the UE detects a first SS/PBCH block in a DBTW, and the set of symbols of a slot for receiving CSI-RS are within the same slot as the symbols for a second SS/PBCH block, wherein the second SS/PBCH block is within the same DBTW as the first SS/PBCH block and QCLed with the first SS/PBCH block, then the UE cancels the reception of CSI-RS. This example is illustrated in FIG. 11 (e.g., 1103).

In one example, at least one of the following conditions for this example is provided. In one instance of a first condition, the UE is not indicated to receive PDCCH, PDSCH, or CSI-RS on the set of symbols in the slot. In one instance of a second condition, the UE is indicated that the set of symbols in the slot are within the channel occupancy. In one instance of a third condition, the CSI-RS is configured to be QCLed with the first and second SS/PBCH blocks. In one instance of a fourth condition, the CSI-RS is configured to be associated with the SS/PBCH block with SS/PBCH block index same as the first SS/PBCH block.

In one embodiment, a PDCCH of RMSI can be used for validation of the transmission of a CSI-RS. PDCCH of RMSI can be part of a discovery burst and be shared with the channel access procedure with the SS/PBCH blocks in the discovery burst. If a CSI-RS is also configured as part of the discovery burst, PDCCH of RMSI can be used for validation of the transmission of a CSI-RS.

Figure 12:
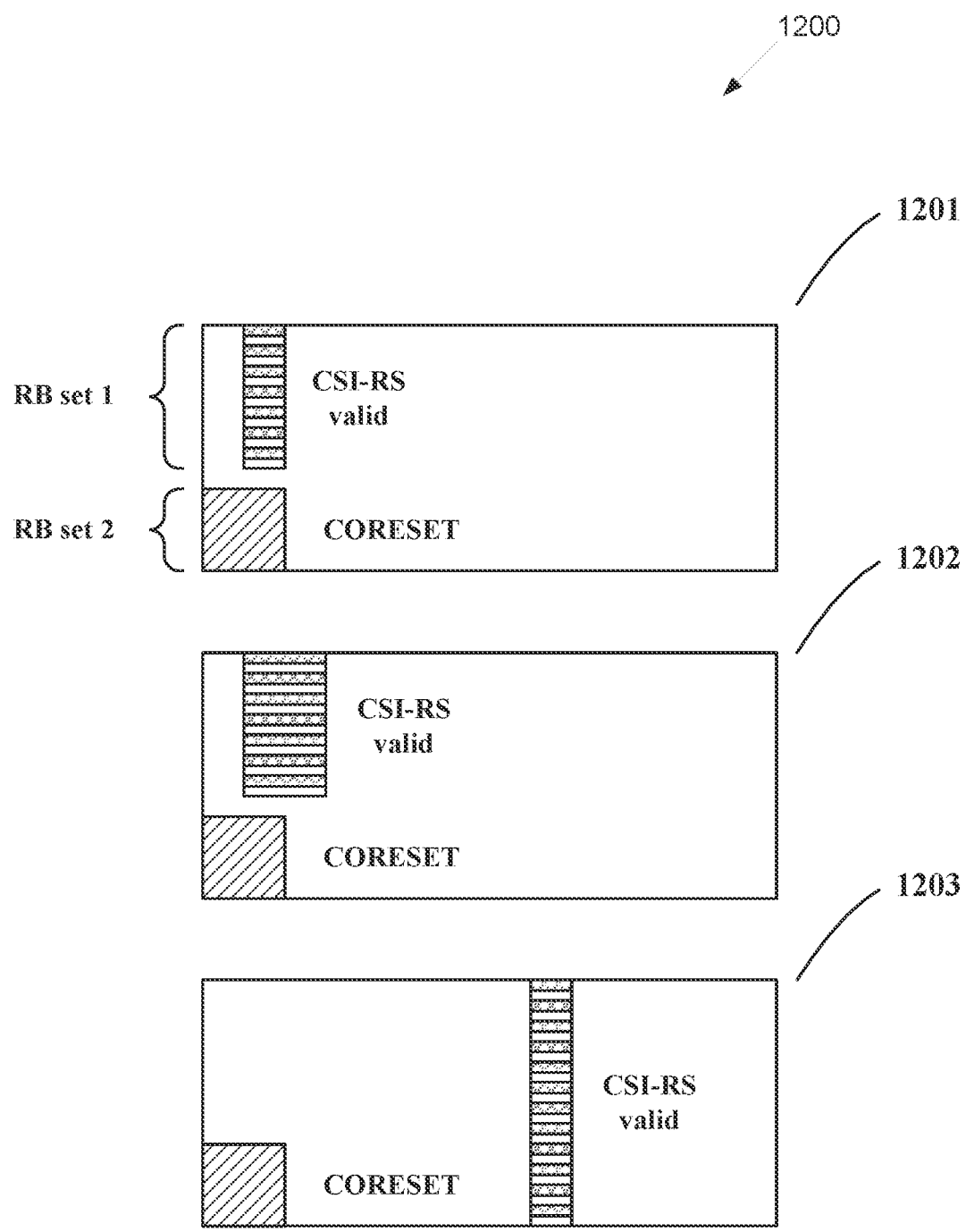
FIG. 12 illustrates an example CSI-RS validation based on CORESET for monitoring Type0-PDCCH according to embodiments of the present disclosure.

FIG. 12 illustrates an example CSI-RS validation based on CORESET for monitoring Type0-PDCCH 1200 according to embodiments of the present disclosure. An embodiment of the CSI-RS validation based on CORESET for monitoring Type0-PDCCH 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

In one example, for a set of symbols of a slot configured by higher layer parameters to receive CSI-RS, if the UE detects the set of symbols of the slot are included in the symbols in a CORESET configured for monitoring Type0-PDCCH, the UE receives the CSI-RS. This example is illustrated in FIG. 12 (e.g., 1201).

In one example, the CSI-RS and the CORESET may be located in different RB sets.

In another example, at least one of the following conditions for this example is provided. In one instance of a first condition, the UE is indicated that the set of symbols in the slot are within the channel occupancy. In one instance of a second condition, the CSI-RS is configured to be QCLed with the CORESET. In one instance of a third condition, the UE is not indicated to transmit PUSCH, PUCCH, PRACH, or SRS in the set of symbols of the slot.

In another example, for a set of symbols of a slot configured by higher layer parameters to receive CSI-RS, if the UE detects the set of symbols of the slot overlap with the symbols in a CORESET configured for monitoring Type0-PDCCH, the UE receives the CSI-RS. This example is illustrated in FIG. 12 (e.g., 1202).

In one example, at least one of the following conditions for this example is provided. In one instance of a first condition, the UE is indicated that the set of symbols in the slot are within the channel occupancy. In one instance of a second condition, the CSI-RS is configured to be QCLed with the CORESET. In one instance of a third condition, the UE is not indicated to transmit PUSCH, PUCCH, PRACH, or SRS in the set of symbols of the slot.

In yet another example, for a set of symbols of a slot configured by higher layer parameters to receive CSI-RS, if the UE is configured with a CORESET for monitoring Type0-PDCCH in the same slot, the UE receives the CSI-RS. This example is illustrated in FIG. 12 (e.g., 1203).

In one example, at least one of the following conditions for this example is provided. In one instance of a first condition, the UE is indicated that the set of symbols in the slot are within the channel occupancy. In one instance of a second condition, the CSI-RS is configured to be QCLed with the CORESET. In one instance of a third condition, the UE is not indicated to transmit PUSCH, PUCCH, PRACH, or SRS in the set of symbols of the slot.

Figure 13:
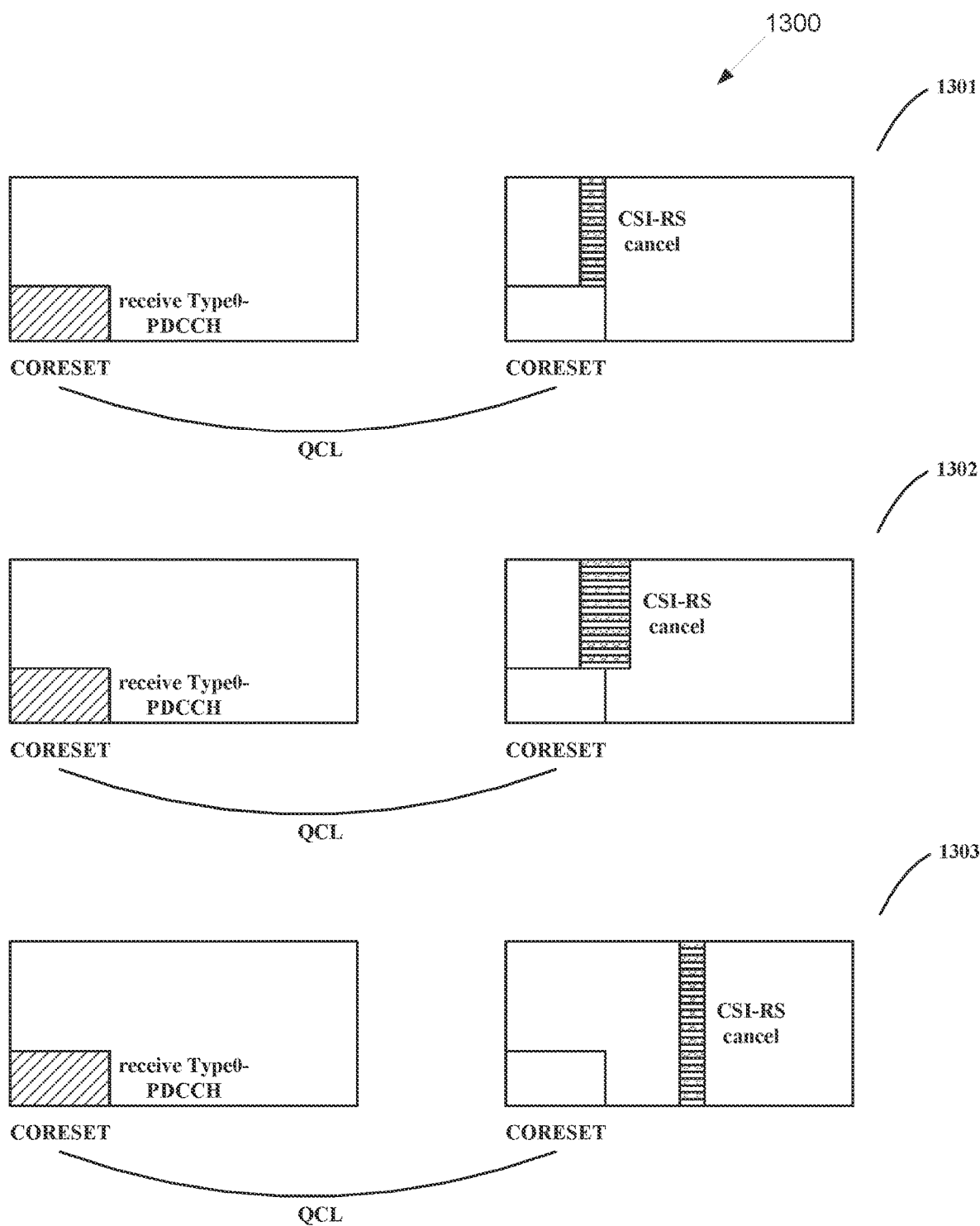
FIG. 13 illustrates another example CSI-RS validation based on CORESET for monitoring Type0-PDCCH according to embodiments of the present disclosure.

FIG. 13 illustrates another example CSI-RS validation based on CORESET for monitoring Type0-PDCCH 1300 according to embodiments of the present disclosure. An embodiment of the CSI-RS validation based on CORESET for monitoring Type0-PDCCH 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

In one example, for a set of symbols of a slot configured by higher layer parameters to receive CSI-RS, if the UE detects a Type0-PDCCH in a first monitoring occasion, and the set of symbols of a slot for receiving CSI-RS are included in the symbols for a second monitoring occasion, wherein the first SS/PBCH block associated with the second monitoring occasion and the second SS/PBCH block associated with the first monitoring occasion are within the same DBTW, and the two SS/PBCH blocks are QCLed, then the UE cancels the reception of CSI-RS. This example is illustrated in FIG. 13 (e.g., 1301).

In one example, at least one of the following conditions for this example is provided. In one instance of a first condition, the UE is not indicated to receive PDCCH, PDSCH, or CSI-RS on the set of symbols in the slot. In one instance of a second condition, the UE is indicated that the set of symbols in the slot are within the channel occupancy. In one instance of a third condition, the CSI-RS is configured to be QCLed with the first and second SS/PBCH blocks. In one instance of a fourth condition, the CSI-RS is configured to be associated with the SS/PBCH block with SS/PBCH block index same as the first SS/PBCH block; in a fifth condition, the two monitoring occasions are in the same DBTW.

In another example, for a set of symbols of a slot configured by higher layer parameters to receive CSI-RS, if the UE detects a Type0-PDCCH in a first monitoring occasion, and the set of symbols of a slot for receiving CSI-RS overlaps with the symbols for a second monitoring occasion, wherein the first SS/PBCH block associated with the second monitoring occasion and the second SS/PBCH block associated with the first monitoring occasion are within the same DBTW, and the two SS/PBCH blocks are QCLed, then the UE cancels the reception of CSI-RS. This example is illustrated in FIG. 13 (e.g., 1302).

In one example, at least one of the following conditions for this example is provided. In one instance of a first condition, the UE is not indicated to receive PDCCH, PDSCH, or CSI-RS on the set of symbols in the slot. In one instance of a second condition, the UE is indicated that the set of symbols in the slot are within the channel occupancy. In one instance of a third condition, the CSI-RS is configured to be QCLed with the first and second SS/PBCH blocks. In one instance of a fourth condition, the CSI-RS is configured to be associated with the SS/PBCH block with SS/PBCH block index same as the first SS/PBCH block; in a fifth condition, the two monitoring occasions are in the same DBTW.

In yet another example, for a set of symbols of a slot configured by higher layer parameters to receive CSI-RS, if the UE detects a Type0-PDCCH in a first monitoring occasion, and a second monitoring occasion is configured in the same slot configured to receive CSI-RS, wherein the first SS/PBCH block associated with the second monitoring occasion and the second SS/PBCH block associated with the first monitoring occasion are within the same DBTW, and the two SS/PBCH blocks are QCLed, then the UE cancels the reception of CSI-RS. This example is illustrated in FIG. 13 (e.g., 1303).

In one example, at least one of the following conditions is provide. In one instance of a first condition, the UE is not indicated to receive PDCCH, PDSCH, or CSI-RS on the set of symbols in the slot. In one instance of a second condition, the UE is indicated that the set of symbols in the slot are within the channel occupancy. In one instance of a third condition, the CSI-RS is configured to be QCLed with the first and second SS/PBCH blocks. In one instance of a fourth condition, the CSI-RS is configured to be associated with the SS/PBCH block with SS/PBCH block index same as the first SS/PBCH block. In one instance of a fifth condition, the two monitoring occasions are in the same DBTW.

In one embodiment, a PDSCH of RMSI can be used for validation of the transmission of a CSI-RS. PDSCH of RMSI can be part of a discovery burst and be shared with the channel access procedure with the SS/PBCH blocks in the discovery burst. If a CSI-RS is also configured as part of the discovery burst, PDSCH of RMSI can be used for validation of the transmission of a CSI-RS.

In one example, for a set of symbols of a slot configured by higher layer parameters to receive CSI-RS, if the UE detects the set of symbols of the slot are included in the symbols configured for receiving PDSCH scheduled by a Type0-PDCCH, the UE receives the CSI-RS.

In one example, at least one of the following conditions for this example is provided. In one instance of a first condition, the UE is indicated that the set of symbols in the slot are within the channel occupancy. In one instance of a second condition, the CSI-RS is configured to be QCLed with the PDSCH scheduled by a Type0-PDCCH. In one instance of a third condition, the UE is not indicated to transmit PUSCH, PUCCH, PRACH, or SRS in the set of symbols of the slot.

In another example, for a set of symbols of a slot configured by higher layer parameters to receive CSI-RS, if the UE detects the set of symbols of the slot overlap with the symbols configured for receiving PDSCH scheduled by a Type0-PDCCH, the UE receives the CSI-RS.

In one example, at least one of the following conditions for this example is provided. In one instance of a first condition, the UE is indicated that the set of symbols in the slot are within the channel occupancy. In one instance of a second condition, the CSI-RS is configured to be QCLed with the PDSCH scheduled by a Type0-PDCCH. In one instance of a third condition, the UE is not indicated to transmit PUSCH, PUCCH, PRACH, or SRS in the set of symbols of the slot.

In yet another example, for a set of symbols of a slot configured by higher layer parameters to receive CSI-RS, if the UE is configured for receiving PDSCH scheduled by a Type0-PDCCH in the same slot, the UE receives the CSI-RS.

In one example, at least one of the following conditions for this example is provided. In one instance of a first condition, the UE is indicated that the set of symbols in the slot are within the channel occupancy. In one instance of a second condition, the CSI-RS is configured to be QCLed with the PDSCH scheduled by a Type0-PDCCH. In one instance of a third condition, the UE is not indicated to transmit PUSCH, PUCCH, PRACH, or SRS in the set of symbols of the slot.

In one embodiment, a PDCCH and/or PDSCH can be used for validation of the transmission of a CSI-RS.

In one example, for a set of symbols of a slot configured by higher layer parameters to receive CSI-RS, if the UE detects the set of symbols of the slot are included in the symbols configured for monitoring PDCCH or receiving PDSCH, the UE receives the CSI-RS.

In one example, at least one of the following conditions for this example is provided. In one instance of a first condition, the UE is indicated that the set of symbols in the slot are within the channel occupancy. In one instance of a second condition, the CSI-RS is configured to be QCLed with the PDCCH or PDSCH (PDCCH or PDSCH of OSI or paging for example). In one instance of a third condition, the UE is not indicated to transmit PUSCH, PUCCH, PRACH, or SRS in the set of symbols of the slot.

In another example, for a set of symbols of a slot configured by higher layer parameters to receive CSI-RS, if the UE detects the set of symbols of the slot overlap with the symbols configured for monitoring PDCCH or receiving PDSCH, the UE receives the CSI-RS.

In one example, at least one of the following conditions for this example is provided. In one instance of a first condition, the UE is indicated that the set of symbols in the slot are within the channel occupancy. In one instance of a second condition, the CSI-RS is configured to be QCLed with the PDCCH or PDSCH (PDCCH or PDSCH of OSI or paging for example). In one instance of a third condition, the UE is not indicated to transmit PUSCH, PUCCH, PRACH, or SRS in the set of symbols of the slot.

In yet another example, for a set of symbols of a slot configured by higher layer parameters to receive CSI-RS, if the UE is configured for monitoring PDCCH or receiving PDSCH in the same slot, the UE receives the CSI-RS.

In one example, at least one of the following conditions for this example is provided. In one instance of a first condition, the UE is indicated that the set of symbols in the slot are within the channel occupancy. In one instance of a second condition, the CSI-RS is configured to be QCLed with the PDCCH or PDSCH (PDCCH or PDSCH of OSI or paging for example). In one instance of a third condition, the UE is not indicated to transmit PUSCH, PUCCH, PRACH, or SRS in the set of symbols of the slot.

In one embodiment, a second CSI-RS triggered by DCI can be used for validation of the transmission of a first CSI-RS.

In one example, for a set of symbols of a slot configured by higher layer parameters to receive a first CSI-RS, if the UE detects the set of symbols of the slot are included in the symbols configured by DCI to receive a second CSI-RS, the UE receives the first CSI-RS.

In one example, at least one of the following conditions for this example is provided. In one instance of a first condition, the UE is indicated that the set of symbols in the slot are within the channel occupancy. In one instance of a second condition, the first CSI-RS is configured to be QCLed with the second CSI-RS. In one instance of a third condition, the UE is not indicated to transmit PUSCH, PUCCH, PRACH, or SRS in the set of symbols of the slot.

In another example, for a set of symbols of a slot configured by higher layer parameters to receive a first CSI-RS, if the UE detects the set of symbols of the slot overlap with the symbols configured by DCI to receive a second CSI-RS, the UE receives the first CSI-RS.

In one example, at least one of the following conditions for this example is provided. In one instance of a first condition, the UE is indicated that the set of symbols in the slot are within the channel occupancy. In one instance of a second condition, the first CSI-RS is configured to be QCLed with the second CSI-RS. In one instance of a third condition, the UE is not indicated to transmit PUSCH, PUCCH, PRACH, or SRS in the set of symbols of the slot.

In yet another example, for a set of symbols of a slot configured by higher layer parameters to receive a first CSI-RS, if the UE is configured by DCI to receive a second CSI-RS in the same slot, the UE receives the first CSI-RS.

In one example, at least one of the following conditions for this example is provide. In one instance of a first condition, the UE is indicated that the set of symbols in the slot are within the channel occupancy. In one instance of a second condition, the first CSI-RS is configured to be QCLed with the second CSI-RS. In one instance of a third condition, the UE is not indicated to transmit PUSCH, PUCCH, PRACH, or SRS in the set of symbols of the slot.

Figure 14:
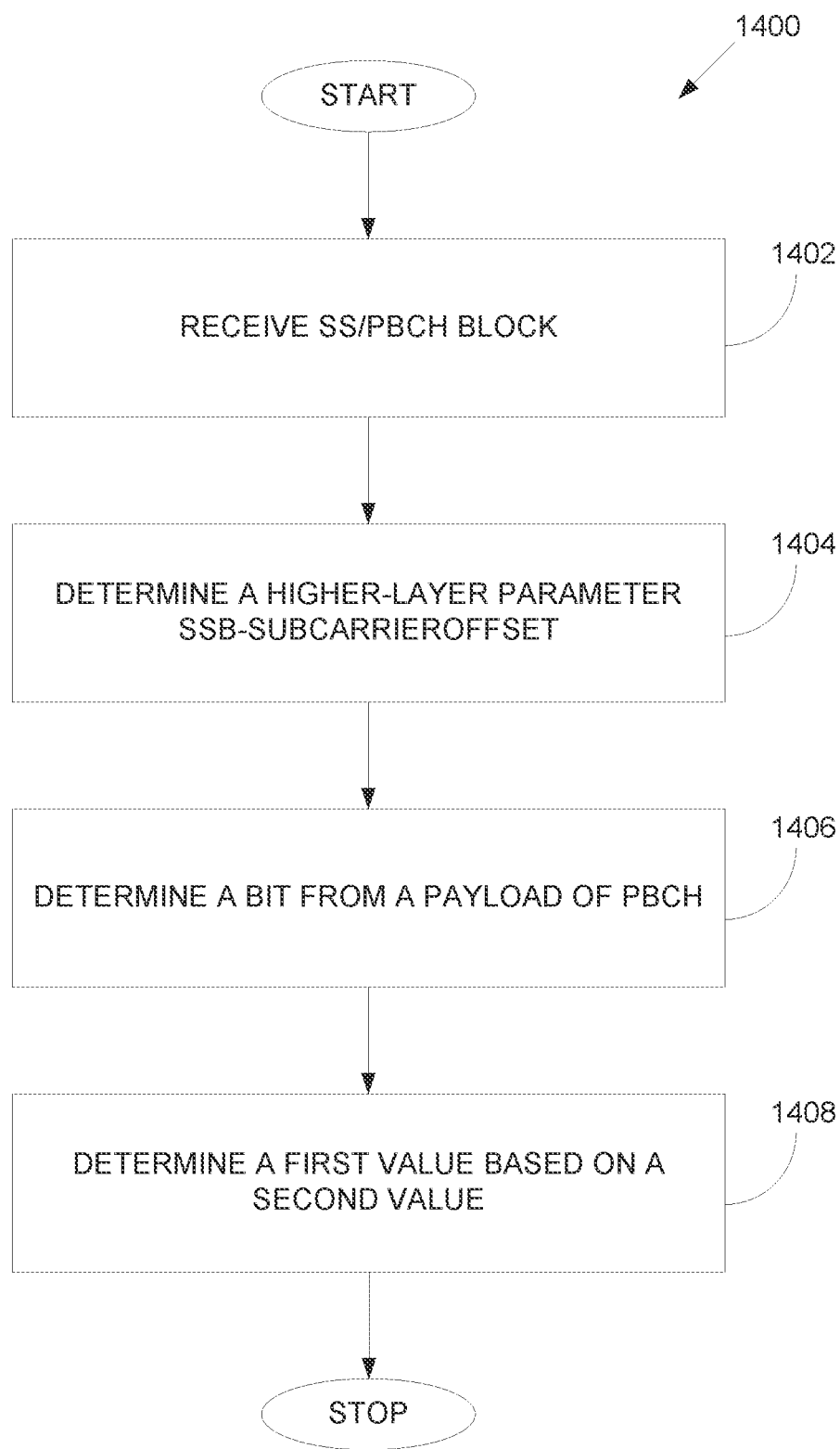
FIG. 14 illustrates a flowchart of a method for determining subcarrier offset on licensed spectrum according to embodiments of the present disclosure.

FIG. 14 illustrates a flowchart of a method 1400 for determining subcarrier offset on licensed spectrum according to embodiments of the present disclosure, as may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, the method 1400 begins at step 1402. In step 1402, the UE receives an SS/PBCH block.

Subsequently, in step 1404, the UE determines a higher-layer parameter ssb-SubcarrierOffset based on an MIB of a PBCH included in the SS/PBCH block.

Next, in step 1406, the UE determines a bit ($\bar{a}_{\bar{A}+5}$) from a payload of the PBCH.

Finally, in step 1408, the UE determines a first value ($k_{SSB}$) based on a second value ($\bar{k}_{SSB}$). In step 1408, four LSBs of the second value ($\bar{k}_{SSB}$) are indicated by the higher-layer parameter ssb-SubcarrierOffset and an MSB of the second value ($\bar{k}_{SSB}$) is indicated by the bit ($\bar{a}_{\bar{A}+5}$).

In one embodiment, the UE, based on a determination that $\bar{k}_{SSB} \geq 24$, identifies that $k_{SSB} = \bar{k}_{SSB}$ and, based on a determination that $\bar{k}_{SSB} < 24$, identifies that $k_{SSB} = 2 \cdot \lfloor \bar{k}_{SSB}/2 \rfloor$.

In one embodiment, the UE determines a higher-layer parameter subCarrierSpacingCommon based on the MIB of the PBCH included in the SS/PBCH block, and, based on a determination that $k_{SSB} < 24$, determines a third value ($N_{SSB}^{QCL}$) based on the higher-layer parameter subCarrierSpacingCommon and an LSB of the higher-layer parameter ssb-SubcarrierOffset.

In one embodiment, the UE determines $N_{SSB}^{QCL}$ as 1 based on a determination that the higher-layer parameter subCarrierSpacingCommon is scs15or60 and the LSB of the higher-layer parameter ssb-SubcarrierOffset is 0, determines $N_{SSB}^{QCL}$ as 2 based on a determination that the higher-layer parameter subCarrierSpacingCommon is scs15or60 and the LSB of the higher-layer parameter ssb-SubcarrierOffset is 1, determines $N_{SSB}^{QCL}$ as 4 based on a determination that the higher-layer parameter subCarrierSpacingCommon is scs30or120 and the LSB of the higher-layer parameter ssb-SubcarrierOffset is 0, or determines $N_{SSB}^{QCL}$ based on a determination that the higher-layer parameter subCarrierSpacingCommon is scs30or120 and the LSB of the higher-layer parameter ssb-SubcarrierOffset is 1.

In one embodiment, the UE determines a set of symbols of a slot configured by higher-layer parameters to receive CSI-RS, determines a DBTW, and determines whether to receive the CSI-RS in the set of symbols based on a first SS/PBCH block in the DBTW.

In one embodiment, the UE determines to receive the CSI-RS in the set of symbols of the slot configured by the higher-layer parameters based on a determination that the first SS/PBCH block is in the DBTW and the set of symbols overlaps with the first SS/PBCH block, and determines not to receive the CSI-RS in the set of symbols of the slot configured by the higher-layer parameters based on a determination that the first SS/PBCH block is in the DBTW and the set of symbols overlaps with a second SS/PBCH block in the DBTW.

In such embodiment, the first SS/PBCH block and the second SS/PBCH block are QCLed.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system operating with shared spectrum channel access, the UE comprising:
    a transceiver configured to receive a synchronization signals and physical broadcast channel (SS/PBCH) block; and
    a processor operably coupled to the transceiver, the processor configured to:
        determine a higher-layer parameter ssb-SubcarrierOffset based on a master information block (MIB) of a PBCH included in the SS/PBCH block,
        determine a bit ($\bar{a}_{\bar{A}+5}$) from a payload of the PBCH, and
        determine a first value ($k_{SSB}$) based on a second value ($\overline{k}_{SSB}$), wherein:
            if $\overline{k}_{SSB} \geq 24$, $k_{SSB} = \overline{k}_{SSB}$;
            if $\overline{k}_{SSB} < 24$, $k_{SSB} = 2 \cdot \lfloor \overline{k}_{SSB}/2 \rfloor$; and
            four least significant bits (LSBs) of the second value ($k_{ssp}$) are indicated by the higher-layer parameter ssb-SubcarrierOffset and a most significant bit (MSB) of the second value ($\overline{k}_{ssp}$) is indicated by the bit ($\bar{a}_{\bar{A}+5}$).

2. The UE of claim 1, wherein the processor is further configured to:
    determine a higher-layer parameter subCarrierSpacingCommon based on the MIB of the PBCH included in the SS/PBCH block; and
    determine a third value ($N_{SSB}^{QCL}$), based on the higher-layer parameter subCarrierSpacingCommon and an LSB of the higher-layer parameter ssb-SubcarrierOffset, as:
        1, if the higher-layer parameter subCarrierSpacingCommon is scs15or60 and the LSB of the higher-layer parameter ssb-SubcarrierOffset is 0;
        2, if the higher-layer parameter subCarrierSpacingCommon is scs15or60 and the LSB of the higher-layer parameter ssb-SubcarrierOffset is 1;
        4, if the higher-layer parameter subCarrierSpacingCommon is scs30or120 and the LSB of the higher-layer parameter ssb-SubcarrierOffset is 0; or
        8, if the higher-layer parameter subCarrierSpacingCommon is scs30or120 and the LSB of the higher-layer parameter ssb-SubcarrierOffset is 1.

3. The UE of claim 1, wherein the processor is further configured to determine a third value ($N_{SSB}^{QCL}$) based on the higher-layer parameter subCarrierSpacingCommon and an LSB of the higher-layer parameter ssb-SubcarrierOffset, if the first value $k_{SSB} < 24$.

4. The UE of claim 1, wherein the processor is further configured to:
    determine a set of symbols of a slot configured by higher-layer parameters to receive channel state information reference signal (CSI-RS);
    determine a discovery burst transmission window (DBTW); and
    determine whether to receive the CSI-RS in the set of symbols based on a first SS/PBCH block in the DBTW.

5. The UE of claim 4, wherein the processor further is configured to determine to receive the CSI-RS in the set of symbols of the slot configured by the higher-layer parameters, if the first SS/PBCH block is in the DBTW and the set of symbols overlaps with the first SS/PBCH block.

6. The UE of claim 4, wherein:
    the processor is further configured to determine not to receive the CSI-RS in the set of symbols of the slot configured by the higher-layer parameters, if the first SS/PBCH block is in the DBTW and the set of symbols overlaps with a second SS/PBCH block in the DBTW; and
    the first SS/PBCH block and the second SS/PBCH block are quasi-co-located (QCLed).

7. A base station (BS) in a wireless communication system operating with shared spectrum channel access, the BS comprising:
    a processor configured to:
        generate a master information block (MIB) of a physical broadcasting channel (PBCH) included in a synchronization signals and physical broadcast channel (SS/PBCH) block, wherein a higher-layer parameter ssb-SubcarrierOffset is included in the MIB; and
        generate a payload of the PBCH, wherein a bit ($\bar{a}_{\bar{A}+5}$) is included in the payload of the PBCH; and
    a transceiver operably coupled to the processor, the transceiver configured to transmit the SS/PBCH block including the MIB and the payload of the PBCH, wherein:
        a first value ($k_{SSB}$) is indicated based on a second value ($\overline{k}_{SSB}$),
        if $\overline{k}_{SSB} \geq 24$, $k_{SSB} = \overline{k}_{SSB}$;
        if $\overline{k}_{SSB} < 24$, $k_{SSB} = 2 \cdot \lfloor \overline{k}_{SSB}/2 \rfloor$; and
        four least significant bits (LSBs) of the second value ($\overline{k}_{SSB}$) being indicated by the higher-layer parameter ssb-SubcarrierOffset and a most significant bit (MSB) of the second value ($\overline{k}_{SSB}$) being indicated by the bit ($\bar{a}_{\bar{A}+5}$).

8. The BS of claim 7, wherein:
    a higher-layer parameter subCarrierSpacingCommon is included in the MIB of the PBCH included in the SS/PBCH block, a third value ($N_{SSB}^{QCL}$) is indicated based on the higher-layer parameter subCarrierSpacingCommon and an LSB of the higher-layer parameter ssb-SubcarrierOffset, and one of:
  $N_{SSB}^{QCL}$ is 1, if the higher-layer parameter subCarrierSpacingCommon is scs15or60 and the LSB of the higher-layer parameter ssb-SubcarrierOffset is 0;
  $N_{SSB}^{QCL}$ is 2, if the higher-layer parameter subCarrierSpacingCommon is scs15or60 and the LSB of the higher-layer parameter ssb-SubcarrierOffset is 1;
  $N_{SSB}^{QCL}$ is 4, if the higher-layer parameter subCarrierSpacingCommon is scs30or120 and the LSB of the higher-layer parameter ssb-SubcarrierOffset is 0; or
  $N_{SSB}^{QCL}$ is 8, if the higher-layer parameter subCarrierSpacingCommon is scs30or120 and the LSB of the higher-layer parameter ssb-SubcarrierOffset is 1.

9. The BS of claim 7, wherein a third value ($N_{SSB}^{QCL}$) is indicated based on the higher-layer parameter subCarrierSpacingCommon and an LSB of the higher-layer parameter ssb-SubcarrierOffset, if the first value $k_{SSB}<24$.

10. The BS of claim 7, wherein the processor is further configured to:
  determine a set of symbols of a slot configured by higher-layer parameters to transmit channel state information reference signal (CSI-RS);
  identify a discovery burst transmission window (DBTW); and
  determine whether to transmit the CSI-RS in the set of symbols based on a first SS/PBCH block in the DBTW.

11. The BS of claim 10, wherein the transceiver is further configured to transmit the CSI-RS in the set of symbols of the slot configured by the higher-layer parameters, if the first SS/PBCH block is in the DBTW and the set of symbols overlaps with the first SS/PBCH block.

12. The BS of claim 10, wherein:
  the transceiver is further configured to not transmit the CSI-RS in the set of symbols of the slot configured by the higher-layer parameters, if the first SS/PBCH block is in the DBTW and the set of symbols overlaps with a second SS/PBCH block in the DBTW, and
  the first SS/PBCH block and the second SS/PBCH block are quasi-co-located (QCLed).

13. A method of a user equipment (UE) in a wireless communication system operating with shared spectrum channel access, the method comprising:
  receiving a synchronization signals and physical broadcast channel (SS/PBCH) block;
  determining a higher-layer parameter ssb-SubcarrierOffset based on a master information block (MIB) of a PBCH included in the SS/PBCH block;
  determining a bit ($\bar{a}_{\bar{A}+5}$) from a payload of the PBCH; and
  determining a first value ($k_{SSB}$) based on a second value ($\bar{k}_{SSB}$), wherein:
    if $\bar{k}_{SSB} \geq 24$, $k_{SSB} = \bar{k}_{SSB}$;
    if $\bar{k}_{SSB} < 24$, $k_{SSB} = 2 \cdot \lfloor \bar{k}_{SSB}/2 \rfloor$; and
    four least significant bits (LSBs) of the second value ($\bar{k}_{SSB}$) are indicated by the higher-layer parameter ssb-SubcarrierOffset and a most significant bit (MSB) of the second value ($\bar{k}_{SSB}$) is indicated by the bit ($\bar{a}_{\bar{A}+5}$).

14. The method of claim 13, further comprising:
  determining a higher-layer parameter subCarrierSpacingCommon based on the MIB of the PBCH included in the SS/PBCH block; and
  determining a third value ($N_{SSB}^{QCL}$) based on the higher-layer parameter subCarrierSpacingCommon and an LSB of the higher-layer parameter ssb-SubcarrierOffset, wherein determining the third value ($N_{SSB}^{QCL}$) further comprises:
    determining $N_{SSB}^{QCL}$ as 1 based on a determination that the higher-layer parameter subCarrierSpacingCommon is scs15or60 and the LSB of the higher-layer parameter ssb-SubcarrierOffset is 0;
    determining $N_{SSB}^{QCL}$ as 2 based on a determination that the higher-layer parameter subCarrierSpacingCommon is scs15or60 and the LSB of the higher-layer parameter ssb-SubcarrierOffset is 1;
    determining $N_{SSB}^{QCL}$ as 4 based on a determination that the higher-layer parameter subCarrierSpacingCommon is scs30or120 and the LSB of the higher-layer parameter ssb-SubcarrierOffset is 0; or
    determining $N_{SSB}^{QCL}$ as 8 based on a determination that the higher-layer parameter subCarrierSpacingCommon is scs30or120 and the LSB of the higher-layer parameter ssb-SubcarrierOffset is 1.

15. The method of claim 13, further comprising determining the third value ($N_{SSB}^{QCL}$) based on the higher-layer parameter subCarrierSpacingCommon and an LSB of the higher-layer parameter ssb-SubcarrierOffset, based on a determination that the first value $k_{SSB}<24$.

16. The method of claim 13, further comprising:
  determining a set of symbols of a slot configured by higher-layer parameters to receive channel state information reference signal (CSI-RS);
  determining a discovery burst transmission window (DBTW); and
  determining whether to receive the CSI-RS in the set of symbols based on a first SS/PBCH block in the DBTW.

17. The method of claim 16, further comprising:
  determining to receive the CSI-RS in the set of symbols of the slot configured by the higher-layer parameters based on a determination that the first SS/PBCH block is in the DBTW and the set of symbols overlaps with the first SS/PBCH block; and
  determining not to receive the CSI-RS in the set of symbols of the slot configured by the higher-layer parameters based on a determination that the first SS/PBCH block is in the DBTW and the set of symbols overlaps with a second SS/PBCH block in the DBTW,
  wherein the first SS/PBCH block and the second SS/PBCH block are quasi-co-located (QCLed).

* * * * *